United States Patent [19]

Fukui

[11] Patent Number: 5,318,027
[45] Date of Patent: Jun. 7, 1994

[54] STACK-CONNECTABLE ULTRASOUND PROBE, ULTRASOUND IMAGING SYSTEM AND DIAGNOSTIC SONOGRAPHY SYSTEM

[75] Inventor: Yutaka Fukui, Kawasaki, Japan
[73] Assignee: Fujitsu Limited, Kawasaki, Japan
[21] Appl. No.: 932,965
[22] Filed: Aug. 20, 1992

[30] Foreign Application Priority Data

Aug. 20, 1991 [JP] Japan .................................. 3-207891

[51] Int. Cl.⁵ .............................................. A61B 8/00
[52] U.S. Cl. ............................................... 128/660.01
[58] Field of Search ...................... 128/660.01, 661.01, 128/662.03; 73/625-626

[56] References Cited

U.S. PATENT DOCUMENTS

| | | | |
|---|---|---|---|
| 4,372,323 | 2/1983 | Takemura et al. | 128/661.01 |
| 4,726,230 | 2/1988 | Yoshikawa et al. | 128/661.01 X |
| 4,811,740 | 3/1989 | Ikeda et al. | 128/662.03 X |

*Primary Examiner*—Francis Jaworski
*Attorney, Agent, or Firm*—Staas & Halsey

[57] ABSTRACT

The present invention relates to a connectable-as-stacked ultrasound probe, a plurality of which can be connected to at least one probe connecting device provided in an ultrasound imaging system, an ultrasound imaging system and a diagnostic sonography system. A plurality of ultrasound probes can be connected at the same time as the connecting device of the ultrasound imaging system and one of the ultrasound probes connected to the ultrasound imaging system can be used as selected. The ultrasound probe comprises connecting devices 13a and 13b adapted for connection to the connecting device 10a of the ultrasound imaging system 10, other connecting devices 14a and 14b connected and appropriately wired to the connecting devices 13a and 13b, respectively, interconnecting wires 15a and 15b laid between the connecting devices 13a and 14a and between 13b and 14b, respectively, and transducers 16a and 16b connected in parallel to the connecting devices 14a and 14b, respectively, by branching the interconnecting wires 15a and 15b. The ultrasound imaging system 10 comprises a monitor 10b that receives and analyses the data from the probe through the connecting device 10b and displays an ultrasound image. The ultrasound probe and ultrasound imaging system 10 are combined to form a diagnostic sonography system.

20 Claims, 20 Drawing Sheets

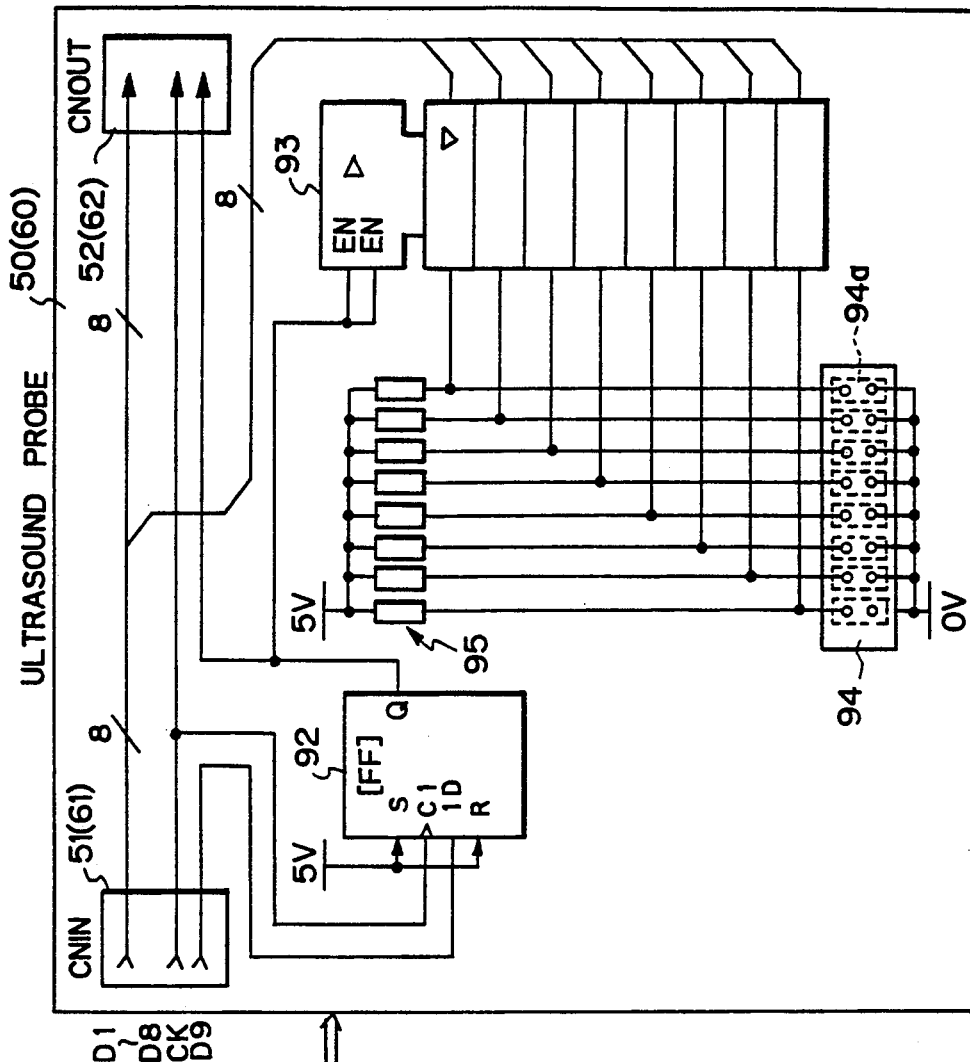
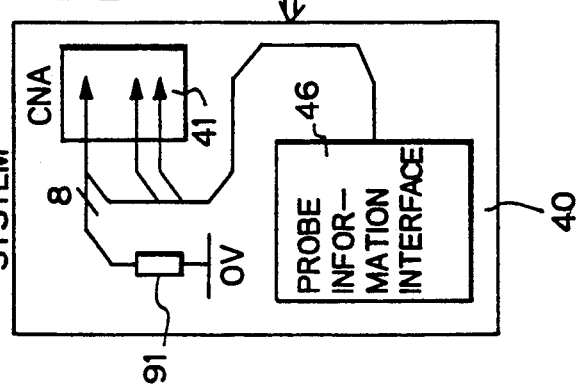
Fig. 7(b)
Fig. 7(a)

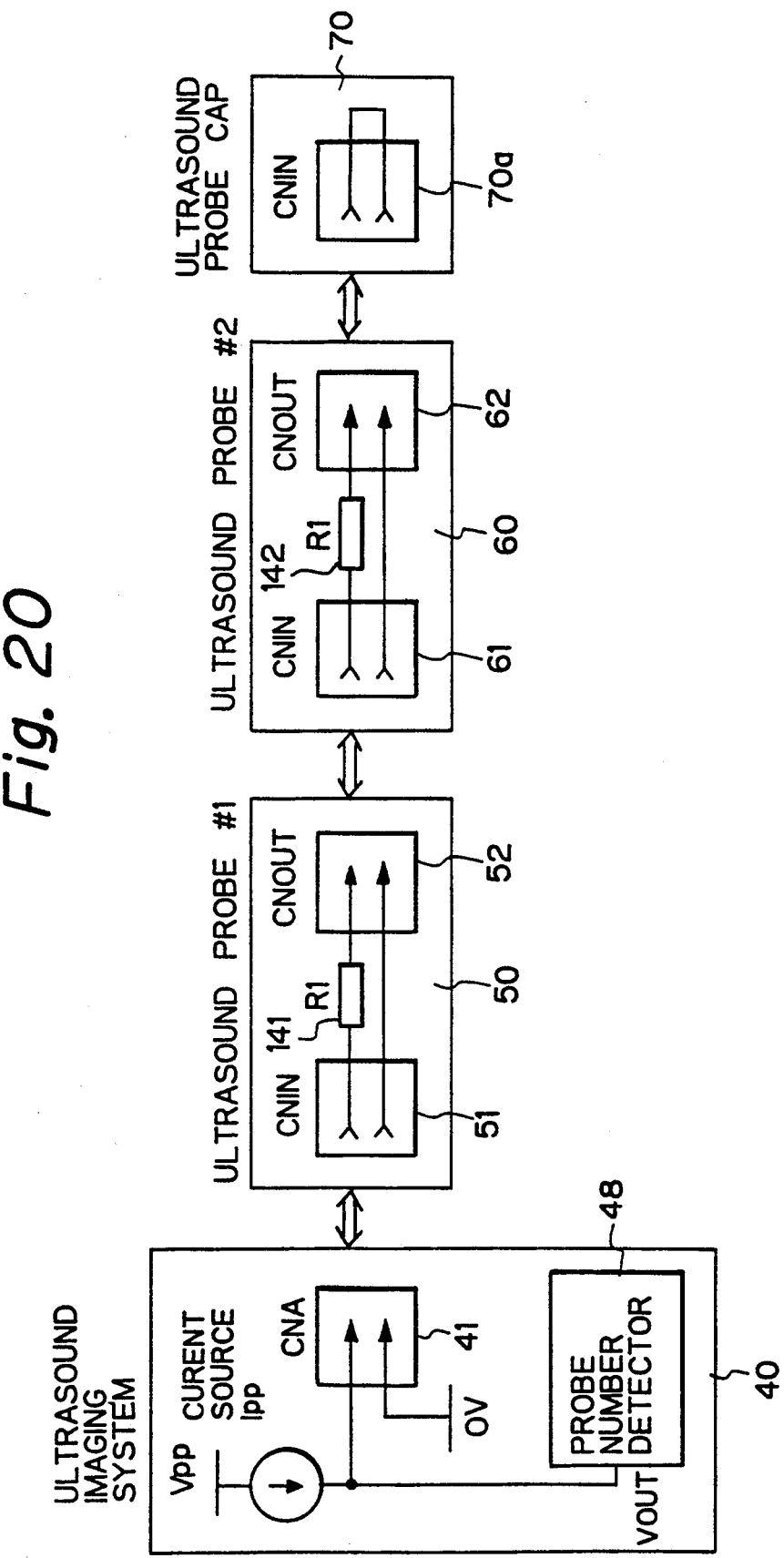

STACK-CONNECTABLE ULTRASOUND PROBE, ULTRASOUND IMAGING SYSTEM AND DIAGNOSTIC SONOGRAPHY SYSTEM

BACKGROUND OF THE INVENTION

1. Field of the Invention

The present invention relates to a connectable-as-stacked (will be referred to as "stack-connectable" hereafter) ultrasound probe, a plurality of which can be connected to at least a probe connector of an ultrasound imaging system, an ultrasound imaging system and a diagnostic sonography system.

2. Description of the Related Art

Recently a variety of advanced ultrasound imaging systems has been proposed, and they are widely used in the clinical fields such as in the study of circulatory organs, internal medicine, examination of obstetric and gynecologic regions, etc. As the ultrasound imaging system has become a prevailing diagnostic tool in the clinical fields, various types of ultrasound probes different in frequency and shape from one another and adapted to meet clinical requirements have been proposed for use. In some clinical fields, the same region of interest has to be examined by using a variety of ultrasound probes. To this end, an ultrasound imaging system is required to which a plurality of ultrasound probes can be connected simultaneously.

FIG. 22 shows the construction of a conventional ultrasound imaging system indicated generally with a reference numeral 1. In the Figure, the reference numerals 1a and 1b indicate connectors, respectively, to which the connectors of ultrasound probes are to be connected. The numerals 2a and 2b indicate select switches, respectively, either of which is used to select the connector 1a or 1b to which an ultrasound probe 7 the operator is going to use is connected. The reference numeral 3 indicates a transmission circuit that generates and supplies an electric signal that will drive an electroacoustic or ultrasound transducer provided in the ultrasound probe. An ultrasound is transmitted from the probe 7 and directed into the body of an examinee. The ultrasound is reflected there and returned to the probe 7. The numeral 4 indicates a reception circuit that amplifies a received electric signal derived from the conversion by the electroacoustic transducer of the reflected ultrasound or echo from inside the examinee's body. The reference numeral 5 indicates a probe information interface that reads the information indicative of the type of ultrasound probe 7 connected to the ultrasound imaging system 1. The numeral 6 indicates a thermal monitoring circuit having a thermistor that detects the temperature inside the ultrasound probe 7. The thermal monitoring circuit 6 comprises thermosensors 6a and 6b and thermosensor select switches 6c and 6d, for each of the ultrasound probes 7.

The ultrasound probe 7 comprises a connector that is to be connected to the connector 1a or 1b of the ultrasound imaging system 1, a group of electroacoustic transducers 7b that generate ultrasound, a thermistor 7c that detects the temperature of the ultrasound probe 7, and a probe information coder 7d that encodes and holds the information indicative of the type of the ultrasound probe 7.

In the above-mentioned arrangement, since connection of the connector 7a of the ultrasound probe 7 to either the connector 1a or 1b of the ultrasound imaging system 1 completes the connection between the connectors 7a and 1a or 1b, only one ultrasound probe 7 can be connected to one connector 1a or 1b. Under these circumstances, the ultrasound imaging system 1 is provided with a plurality of connecting devices (connectors 1a, 1b) to each of which one ultrasound probe 7 is connectable. A desired ultrasound probe is selected for use in a clinical study by operating one of the corresponding select switches 2a and 2b provided on the ultrasound imaging system 1.

In this case, the number of connecting devices that can be provided on one ultrasound imaging system 1 is the upper limit of the number of ultrasound probes 7 simultaneously connectable to one ultrasound imaging system 1.

In the above-mentioned prior art, at a clinical site, a greater number of ultrasound probes 7 are used than the number of connecting devices equipped on an ultrasound imaging system 1 and if it is necessary to use a probe 7 not currently connected to the ultrasound imaging system 1, one of the already connected probes 7 have to be disconnected from the scanner 1 and the necessary probe 7 must be connected to the scanner 1 in place of the disconnected probe, which is very annoying and troublesome to the operator or doctor working in an ultrasound study. Note that, the term "ultrasound" used in the present invention can be alternatively replaced by "ultrasonic", if necessary.

SUMMARY OF THE INVENTION

The present invention has an object to overcome the above-mentioned drawbacks of the prior art by providing a stack-connectable ultrasound probe and an ultrasound imaging system simultaneously connectable to the connecting device thereof and a plurality of ultrasound probes among which a desired probe can be freely selected for use.

The above object can be attained by providing, according to a first aspect of the present invention, an ultrasound probe intended for use in a diagnostic sonography system comprising an ultrasound imaging system having a connecting device for the connection of ultrasound probes and that takes the form of either a plug or receptacle connector and a monitor supplied with ultrasound data from one of the probes through the connecting device and analyzes and displays the ultrasound data, and a plurality of the probes can be connected to the ultrasound imaging system, each of the ultrasound probes comprising a first connecting device connectable to either the connecting device of the ultrasound imaging system or the connecting device of another ultrasound probe; a second connecting device connectable to the connecting device to the first connecting device by means of an interconnecting wire and to the connecting device of one of the other ultrasound probes, and a transducer branched from the interconnecting wire between the first and second connecting devices.

According to a second aspect of the present invention, there is provided an ultrasound imaging system intended for use in a diagnostic sonography system comprising an ultrasound imaging system having a connecting device for the connection of ultrasound probes and that takes the form of either a plug or receptacle connector and a monitor supplied with ultrasound data from one of the probes through the connecting device and analyzes and displays the ultrasound data, and a plurality of the probes can be connected to the ultrasound imaging system; the diagnostic sonography system further having:

means for transmitting to the monitor an electric signal that will generate an ultrasound signal; and means for receiving and amplifying an electric signal derived from conversion by an electroacoustic transducer of the ultrasound probe of the ultrasound reflected from inside the examinee;

the ultrasound imaging system further comprising at least one of the following as selected:

a probe information interface for reading the information on the ultrasound probe connected; and display driving means for generating a signal that will drive a connected-status displaying means provided in the ultrasound probe.

According to a third aspect of the present invention, there is provided a diagnostic sonography system comprising an ultrasound imaging system having a connecting device for the connection of ultrasound probes and that forms either a plug or receptacle connector and a monitor supplied with ultrasound data from one of the probes through the connecting device and analyzes and displays the ultrasound data, and a plurality of the probes can be connected to the ultrasound imaging system, wherein a plurality of the ultrasound probes are connected as stacked to at least one connecting device of the ultrasound imaging system and at least one of the ultrasound probes connected as stacked to each other can be selected for scanning in response to a switch controller provided in the ultrasound imaging system.

BRIEF DESCRIPTION OF THE DRAWINGS

FIG. 7 is a block diagram of a first variant of the probe information transmission system in the embodiment;

FIG. 20 is a block diagram of a second variant of the number-of-probes measuring system in the embodiment;

DETAILED DESCRIPTION OF THE PREFERRED EMBODIMENTS

These and other objects and advantages of the present invention will be better understood from the ensuing description made, by way of example, of the embodiments of ultrasound probe, ultrasound imaging system and diagnostic sonography system according to the present invention with reference to the drawings.

Figure 1:
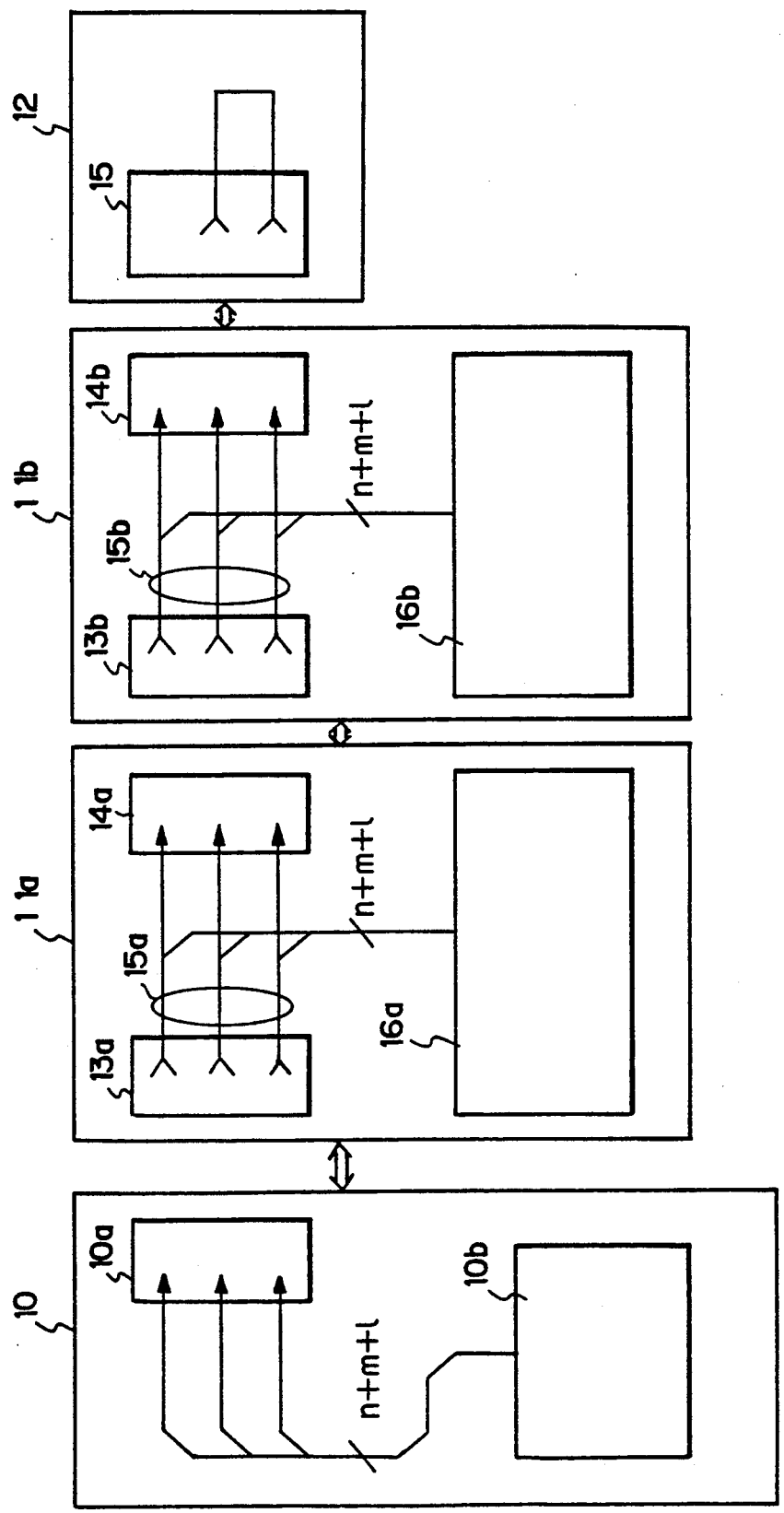
FIG. 1 is a schematic block diagram showing the principle of the present invention.
Figure 2:
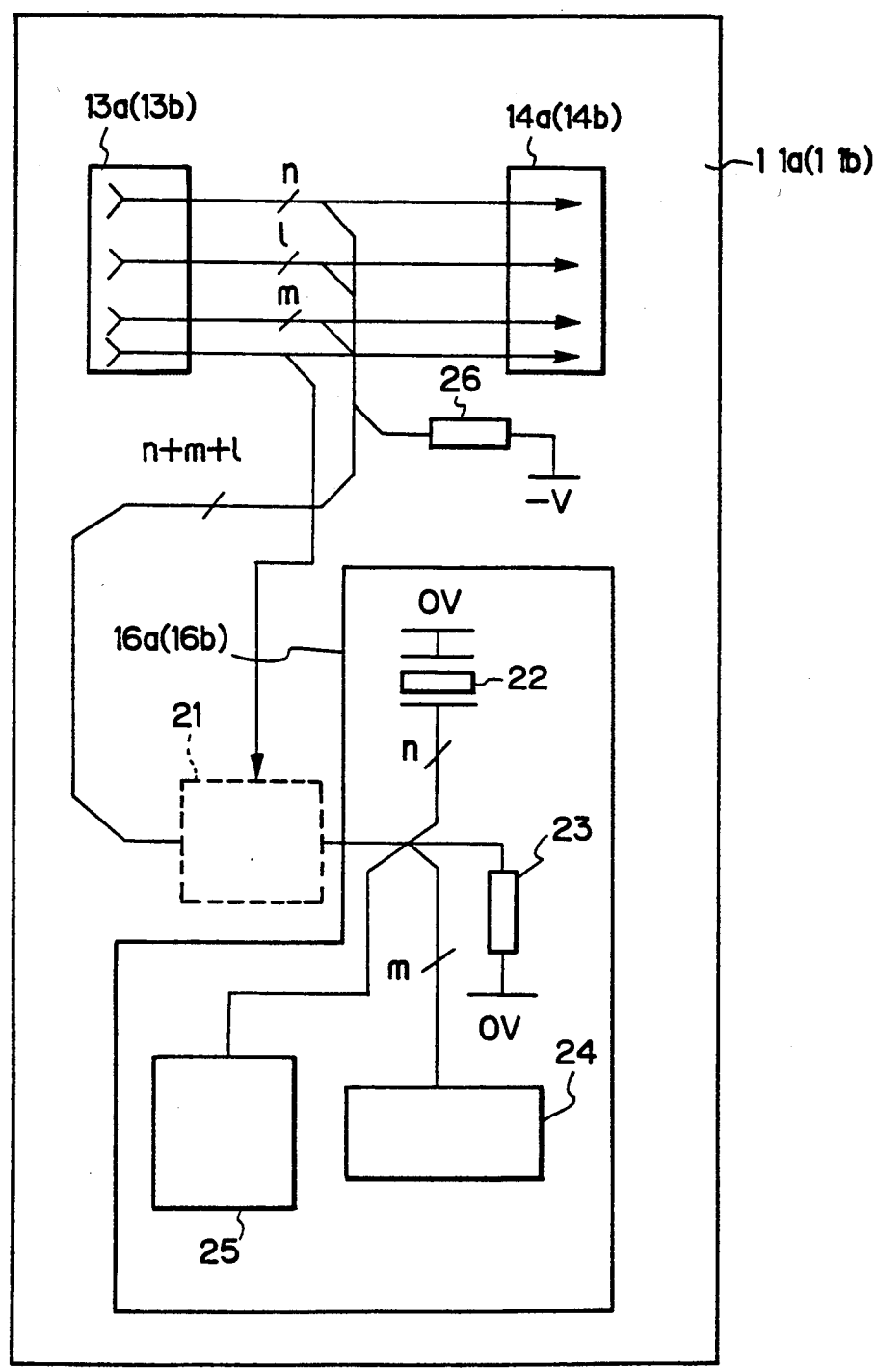
FIG. 2 is a block diagram of the ultrasound probe according to the present invention.
Figure 3:
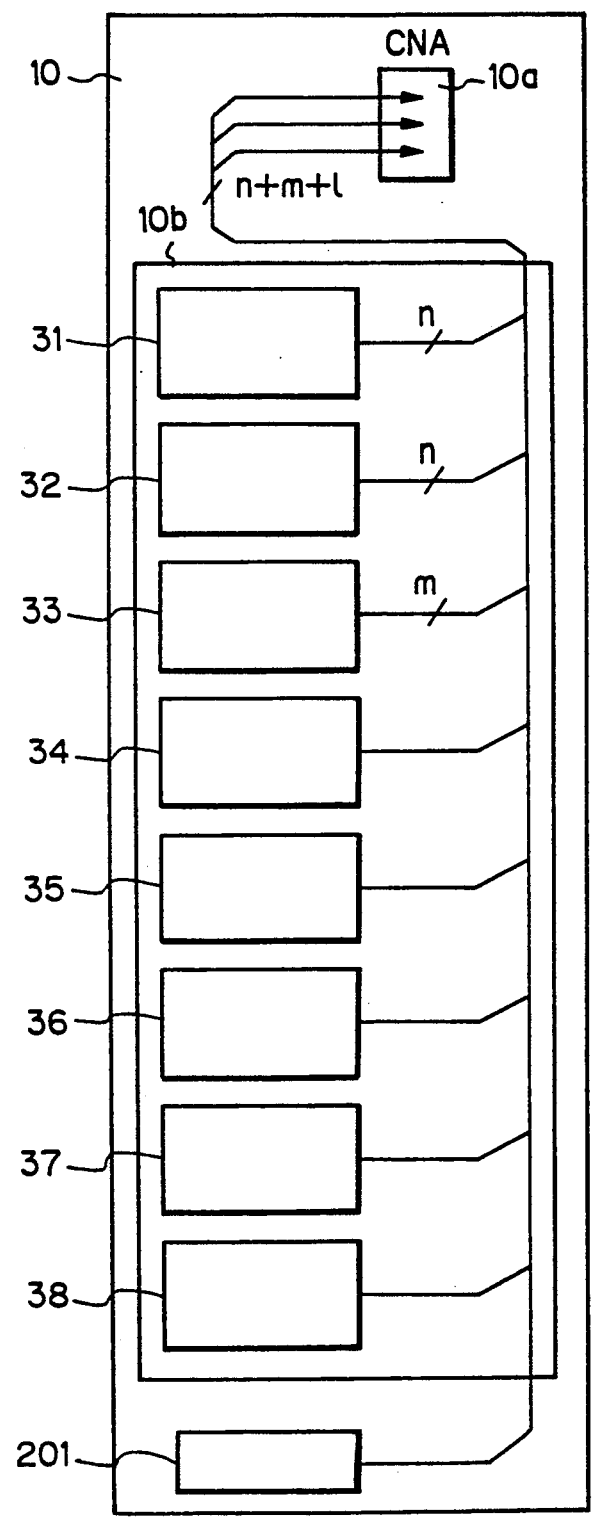
FIG. 3 is a block diagram of the ultrasound imaging system according to the present invention.

Referring now to FIGS. 1 to 3, a diagnostic sonography system 200 comprising ultrasound probes 11 and an ultrasound imaging system 10, to which the ultrasound probes 11 are connected, will be briefly discussed below.

FIG. 1 shows the construction of the diagnostic sonography system 200 in which a plurality of ultrasound probes 11 are connected to a single connecting device 10a of the ultrasound imaging system 10. As shown, the ultrasound scanner 10 comprises the probe connecting device 10a taking the form of a plug or receptacle and a monitor 10b that receives and analyzes the data from the probe through the connecting device 10b and displays necessary data.

The reference numerals 11a and 11b indicate ultrasound probes, respectively, comprising connecting devices 13a and 13b adapted for connection to the connecting device 10a of the ultrasound imaging system 10, other connecting devices 14a and 14b connected and appropriately wired to the connecting devices 13a and 13b, respectively, interconnecting wires 15a and 15b laid between the connecting devices 13a and 14a and between 13b and 14b, respectively, and transducers 16a and 16b connected in parallel to the connecting devices 14a and 14b, respectively, by branching the interconnecting wires 15a and 15b.

The reference numeral 12 indicates a blind cap that comprises a connecting device 15 to be connected to the opened connecting device 10a of the ultrasound imaging system 10 or the opened connecting device 14a or 14b of the ultrasound probe 11a or 11b. The connecting terminal of the connecting device 15 is short-circuited opposite the connected side.

As shown in FIG. 2, the ultrasound probe 11a (or 11b) has an input/output connector 21 for setting the connection between the transducer 16a (or 16b) and ultrasound imaging system 10.

Further, the transducer 16a (or 16b) in the ultrasound probe 11a (or 11b) comprises an electroacoustic or ultrasound transducer element 22 that converts an electric signal to an ultrasound signal that is directed into the examinee and also converts the ultrasound signal reflected from inside the examinee to an electric signal, a probe information setting means 24 for setting probe information and sending it to the ultrasound imaging system 10, and a connected-status display 25 for imparting the status of a probe connection for confirmation by sight, sound and touch.

Further the transducer 16a (or 16b) has a thermosensor 23 that detects the temperature of a probe connected.

Moreover, the ultrasound probe 11a (or 11b) comprises a probe check signal generator 26 for imparting the number of probes 11a (or 11b) connected or a change of the number of probes connected.

As shown in FIG. 3, the monitor 10b of the ultrasound imaging system 10 comprises a transmitter 31 for transmitting an electric signal that is used to generate an ultrasound signal, a receiver 32 for receiving and amplifying an electric signal derived from conversion by the electroacoustic transducer element 22 of the ultrasound probe 11a (or 11b) of the ultrasound reflected from inside the examinee, a probe information interface 33 for reading the information indicative of the ultrasound probe 11a (or 11b) connected, and a display driver 35 for providing a signal that will drive the connected-status display 25 provided in the ultrasound probe 11a (or 11b).

Further the ultrasound imaging system 10 may comprise an input/output connector driver 38 for driving the input/output connector 21 provided in the ultrasound probe 11a (or 11b) connected to the ultrasound imaging system 10.

The ultrasound imaging system 10 also may have a thermal monitor 34 for receiving a signal from the thermosensor 23 provided in the ultrasound probe 11a (or 11b) as necessary and detecting the probe temperature.

Furthermore, the monitor 10b of the ultrasound imaging system 10 is provided with a detector 36 to detect the number of probes connected and the change thereof.

Also the monitor 10b of the ultrasound imaging system 10 is provided with a cap detector 37 for detecting whether the blind cap 12 is attached to the connecting device 10a or 14a (or 14b) of the ultrasound imaging system 10 or the ultrasound probe 11a (or 11b).

Moreover, the ultrasound imaging system 10 according to the present invention may be provided with a display 201 to display the information including the number, types and shapes of probes connected to the ultrasound imaging system 10, and indicating the probe currently in use.

By connecting, as fitted, the connecting device 13a (or 13b) of the ultrasound probe 11a (or 11b) to the single connecting device 10a of the ultrasound imaging system 10, the connecting device 13b (or 13a) of the other ultrasound probe 11b (or 11a) to the other connecting device 14a (or 14b) of the ultrasound probe 11a (or 11b) and the blind cap 12 to the other connecting device 14b of the ultrasound probe 11b (or 11a) to close the connector section, the two ultrasound probes 11a and 11b can be connected to the single connecting device 10a.

Concerning the ultrasound probe 11a (or 11b), the input/output connector 21 is opened or closed with the output signal from the input/output connection driver 38 so that the transducer 16a (or 16a) of the ultrasound probe 11a (or 11b) to be used is put into a circuit of the ultrasound imaging system 10 and one of the desired plurality of ultrasound probes 11a or 11b connected through the single connecting device 10a of the ultrasound imaging system 10 is electrically connected to the ultrasound imaging system 10.

When one probe 11a (or 11b) is thus connected to the ultrasound imaging system 10 and a signal is provided from the transmitter 31 to drive the electroacoustic transducer element 22, this element 22 in the transducer 16a (or 16a) converts the signal to an ultrasound that is transmitted into the examinee, receives and converts into an electric signal the ultrasound signal reflected from inside the examinee, and delivers the electric signal thus converted to the receiver 32. Thus, the result of the ultrasound examination is received and can be displayed, for example, as an image on the display 201.

The thermosensor 23 detects the temperature of the probe in use, sends it to the thermal monitor 34 for confirming that the probe is normally used. The probe information setting means 34 informs the probe information interface 33 of the probe information including the frequency, dimensions, number, spatial arrangement, shape, etc. of the electroacoustic transducer element 22 of the connected ultrasound probe. That is, necessary data for analysis of the transmitter 31, receiver 32 and thermal monitor 34 are thus provided.

During use in an ultrasound examination, the connected-status display 25, which is for example, a light-emitting means such as an LED or the like, provides a sight, sound or touch indication of the connected status for easy confirmation of the probe that is used among the ultrasound probes 11a (or 11b) connected.

The ultrasound imaging system 10 generates a signal from the number-of-probes detector 36 to examine the connected status of the probe check signal generator 26 of each of the ultrasound probes 11a and 11b connected to the ultrasound imaging system, thereby checking the number or change in number of the ultrasound probes 11a and 11b connected. All the ultrasound probes comprise, for example, the same resistor and constant voltage or current source, and thus the probe checking signal generator 26 can detect the quantity of a voltage or current generated from a combination of the resistor and constant voltage or current source to determine the number of probes connected.

Furthermore, before the ultrasound imaging system is used in an ultrasound study, the cap detector 37 in the ultrasound imaging system 10 checks whether or not the blind cap 12 exists at the connecting device 14b (or 14a) of the connected ultrasound probe 11a (or 11b) or the connecting device 10a of the ultrasound imaging system 10.

In the diagnostic sonography system according to the present invention, connecting devices different in connecting structure are provided in each of at least two of a plurality of individual ultrasound probes 11 (11a, 11b, 11c, ..., 11n) connected in series, that is, as "stacked", to the single connecting device 10a of the ultrasound scanner 10 in order such that one of the plurality of ultrasound probes 11 can be used as selected in an ultrasound study.

More particularly, in the case that the first connecting device in one ultrasound probe is designed as, for example, a plug type one, the second connecting device is designed as a receptacle type one. The single connecting device of the ultrasound imaging system 10 adopts either the first or second type of connecting structure.

Therefore, in the case that the connecting device 10a of the ultrasound imaging system 10 is, for example, of the first type of connecting structure, namely, the plug type structure, the first ultrasound probe 11a connected to the ultrasound imaging system 10 has the second connecting device of the receptacle type connected to the connecting device 10a of the ultrasound imaging system 10, and the second ultrasound probe 11b has the second connecting device of the receptacle type connected to the first connecting device of the plug type of the ultrasound probe 11a. Thus the plurality of ultrasound probes 11n is stack-connected to the single connecting device 10a of the ultrasound imaging system 10.

One of the connecting devices of the ultrasound probe 11 is connected to the ultrasound imaging system or to one of the connecting devices of another ultrasound probe 11 in some cases. In other words, the destinations of the first and second connecting devices of the ultrasound probe 11 are not known. However, the first connecting device 13 of the ultrasound probe 11a is connected to the connecting device 10a of the ultrasound imaging system or to either the first or second connecting device of any other ultrasound probe 11c, while the second connecting device 14 of the ultrasound probe 11a is connected to one of the connecting devices of a further ultrasound probe 11b.

Further, a selection controller, switching device, and a discriminating means permitting the operator to know the number and application of the ultrasound probe 11 and determine which of the ultrasound probes connected is in operation are provided for free selection of one of the plurality of ultrasound probes 11 stack-connected in series, and for transmission to the ultrasound imaging system 10 and analysis of the diagnostic information obtained with the transducer 16 in the ultrasound probe 11.

The operator will first use the probe information interface 33 of the ultrasound imaging system 10 to collect, by scanning, a part or all of the information such as number, performance, characteristic, shape, application, resolution, dimensions, spatial arrangement, frequency, etc. of all the ultrasound probes 11 (11a, 11b, 11c, . . . , 11n) connected to the ultrasound imaging system 10 and display the data on the display 201 for the individual probes.

Thereafter the operator can select one of the plurality of ultrasound probes 11 stack-connected to the ultrasound imaging system by watching the information displayed on the display and operating, for example, a predetermined ultrasound probe, of the select keys provided on the control panel of the ultrasound imaging system.

In the diagnostic sonography system according to the present invention, a predetermined selection controller transmits the information only of the ultrasound probe 11a once selected to the monitor 10b of the ultrasound imaging system 10; the information of which is subject to a predetermined analyzes.

For the next ultrasound study upon completion of an ultrasound study, repetition of a similar selection to the above-mentioned procedure will permit the selection of a desired ultrasound probe easily, correctly and rapidly.

An embodiment of the diagnostic sonography system according to the present invention will be described below with reference to FIGS. 5 to 21.

The embodiment of a diagnostic sonography system will be described taking, for the sake of illustration, an example in which two ultrasound probes of the same connecting structure are connected.

FIG. 4 shows the construction of one embodiment of the diagnostic sonography system according to the present invention. The reference numeral 40 indicates an ultrasound imaging system having a plug type connector (CNA) 41, instead of the previously-mentioned connecting device, to which ultrasound probes 50 and 60 can be connected in series, and a monitor 42 that analyzes the information supplied through the plug connector 41 from the probes 50 and 60.

Figure 4A:
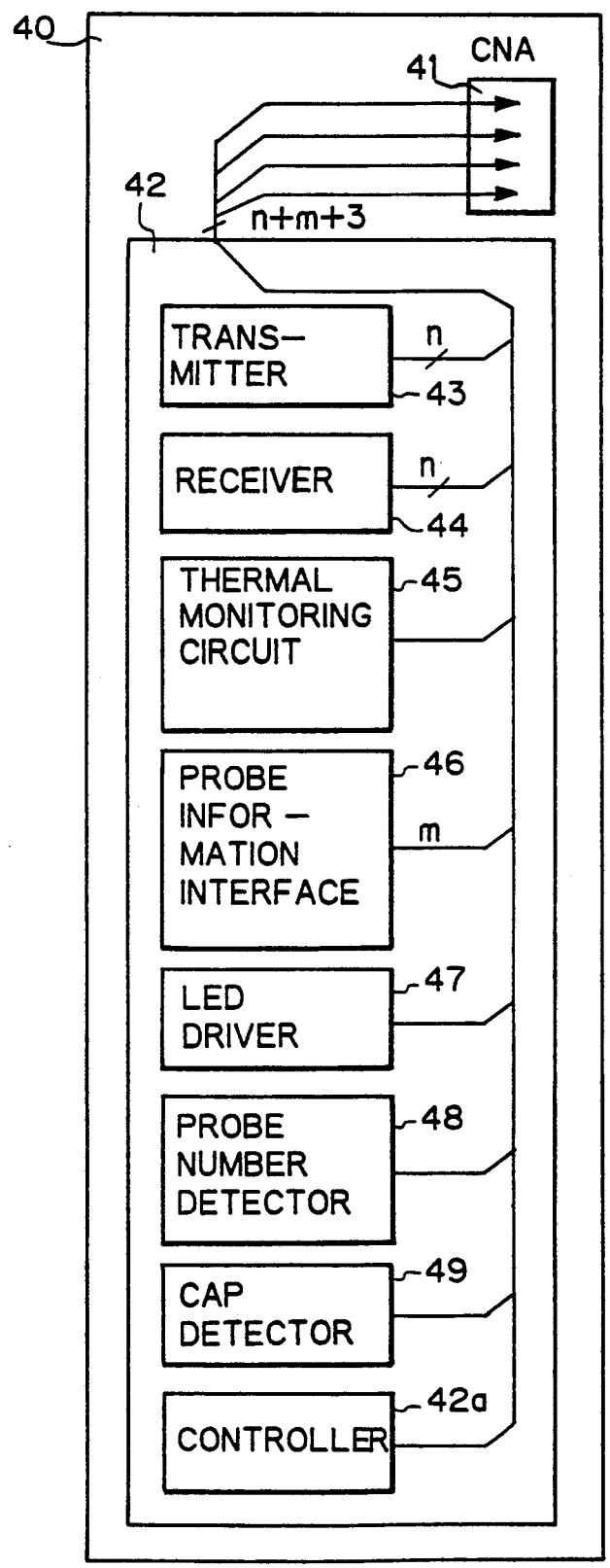
FIG. 4 is a block diagram of an embodiment of the ultrasound imaging system according to the present invention.

As shown in FIG. 4(a), the monitor 42 comprises a transmission circuit 43 that produces an electric signal for the transmission of an ultrasound into the examinee, a reception circuit 44 that receives and amplifies gan electric signal derived from conversion of the ultrasound reflected from inside the examinee, a thermal monitoring circuit 45 that detects the temperature of a probe, a probe information interface 46 that, upon receiving set probe information, reads the information, such as type, shape, etc., on the probe 50 or 60 currently connected, a display drive 47 that delivers a signal indicating that the probe 50 or 60 is being used, a number-of-probes detector 48 that detects the number of probes 50 or 60 connected to the plug connector 41, a cap detector 49 that detects that a blind cap is attached directly to the plug connector 41 or to the probe 50 or 60 connected to the plug connector 41, and a controller 42a that designates various kinds of control to the probe 50 or 60.

Figure 4B:
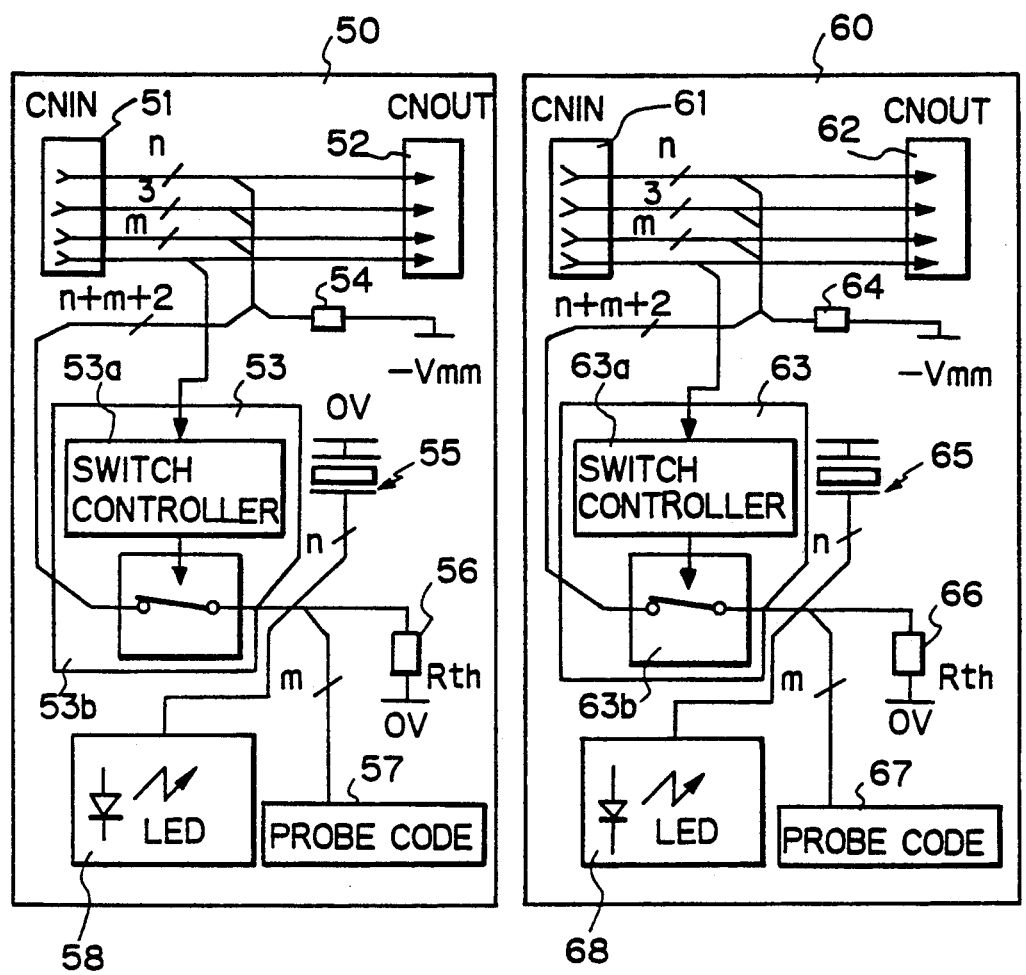
Figure 4C:
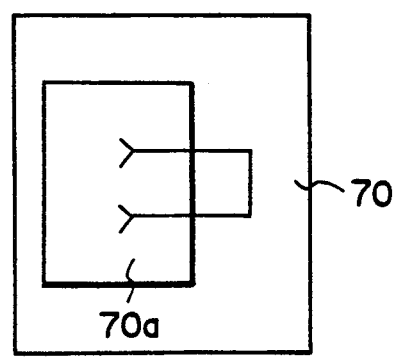

As shown in FIGS. 4(b) or 4(c), the probe 50 (or 60) comprises a receptacle type connector (CNIN) 51 (or 61), as the first connecting device, which is to be fitted into the plug connector 41 of the ultrasound imaging system 40, a plug connector (CNOUT) 52 (or 62), instead of the previously-mentioned second connecting device, which is to be fitted onto the receptacle connector 51 (or 61), an input/output connector 53 (or 63) that sets an electrical connection with the ultrasound imaging system 40, a probe check signal generation circuit 54 (or 64) forming a circuit of a constant resistance, a plurality of, for example, 64 or 128, ultrasound transducer elements 55 (or 65) in a group, that form together an electroacoustic or ultrasound transducer, a thermosensor 56 (or 66) made of a thermistor, a probe coder 57 (or 67), instead of the previously-mentioned probe information setting means, to set the probe information such as frequency, dimensions, number, spatial arrangement, shape, etc. of the ultrasound transducer elements 55 (or 65) in a group, and a set-status indicator 58 (or 68), instead of the previously-described connected-status indicator, made of light-emitting diodes (LED). Such probe information or codes are analyzed in the probe information interface 46 of the ultrasound imaging system to discriminate the structure and performance of the ultrasound probe connected.

The input/output connector 53 (or 63) comprises a switch controller 53a (or 63a) that, upon receiving a select signal from the ultrasound imaging system 40, controls the switching of electrical connection between the ultrasound imaging system 40 and ultrasound probe 50 (or 60), and an on/off switch 53b (or 63b) that turns on and off the electrical connection under the control of the switch controller 53a (or 63a).

As shown in FIG. 4(c), the cap 70 is provided with a receptacle connector 70a that is to be fitted directly into the plug connector 41 or into the plug connector 52 or 62 of the probe 50 or 60 connected to the plug connector 41, and short-circuits each connecting a terminal at the opposite end of the connecting opening of the receptacle connector 70a. The cap 70 has a body that covers the receptacle connector 70a and is made of an electrically conductive material for electromagnetic shielding, and has the entire outer surface, except for the connector opening, covered with an electrically insulative film for electrical insulation from the inner surface.

With the ultrasound imaging system 40 operated in this diagnostic sonography system, the receptacle connector 51 of the probe 50 is connected to the single plug connector 41 of the ultrasound imaging system 40 and the receptacle connector 61 is connected to the plug connector 52 of the probe 50, thus the plurality of probes 50 and 60 are connected to the single connector (plug type) of the ultrasound imaging system 40. At this time, the connection of the cap 70 with the plug connector 62 of the probe protects the circuit end and shuts off any external noise.

When the probes 50 and 60 are connected to each other, the probe coder 57 or 67 sends to the probe information interface 46 detailed information on the probe 50 or 60 connected to the ultrasound imaging system 40, and thereafter a signal is sent from the ultrasound imaging system 40 to put into operation the input/output connector 53 or 63 of the probe 50 or 60 that is to be used, thus causing the switch controller 53a or 63a to activate the switch 53b or 63b, thereby providing an electrical connection between the ultrasound imaging system 40 and the desired probe 50 or 60.

When the ultrasound imaging system 40 and the probe 50 or 60 is thus electrically connected to each other, the ultrasound imaging system 40 generates a transmission signal to drive the group of ultrasound transducers 55 or 65, which will generate an ultrasound. At this time, the temperature measured by the thermosensor 56 or 66 is sent to the thermal monitoring circuit 45 to monitor whether if the ultrasound is generated in a normal range of probe temperature. A set-status display 58 or 68 may be provided to emit light so that the operator knows which probe 50 or 60 is in operation.

In this diagnostic sonography system, the receptacle connector 51 is connected to the single plug connector 41 of the ultrasound imaging system 40 and the receptacle connector 61 of the probe 60 is connected to the plug connector 52 of the probe 50, thereby permitting the connection of a plurality of probes 50 and 60 to the single (plug) connector 41 of the ultrasound imaging system 40. At this time, connection of the cap 70 to the plug connector of the probe 60 protects the circuit end and shuts off any external noise.

The input/output connector 53 or 63 is activated to turn on the switch 53b or 63b by means of the switch controller 53a or 63a, thereby electrically connecting the probe 50 or 60 to the ultrasound imaging system 40. Thus, a necessary prove can freely by selected from the probes 50 and 60 connected to the same plug connector 41 of the ultrasound imaging system 40.

At the time of an ultrasound study, probe information is sent from the probe coder 57 or 67 and probe temperature measured by the thermosensor 56 or 66 is supplied. Thus detailed information on the probe 50 or 60 connected to the ultrasound imaging system 40 can be supplied and the transmission of ultrasound in a normal range of probe temperatures can be monitored. The set-status display 58 or 68 emits light so that the operator will easily know which is in operation, 50 or 60. Hence, it is easy to select a probe and diagnose the examinee by using a desired probe 50 or 60.

By coupling the cap 70 to the plug connector 62 of the probe 60 while the probe 50 or 60 is being connected, it is possible to protect the circuit end and prevent any external contact with the connector and prevent external noise. Thus the operator can be safely engaged in diagnostic sonography, and equipment reliability as well as the reliability and efficiency of the diagnosis can be considerably improved.

Various variants of the measuring system in this diagnostic sonography system will be described below.

Figure 5:
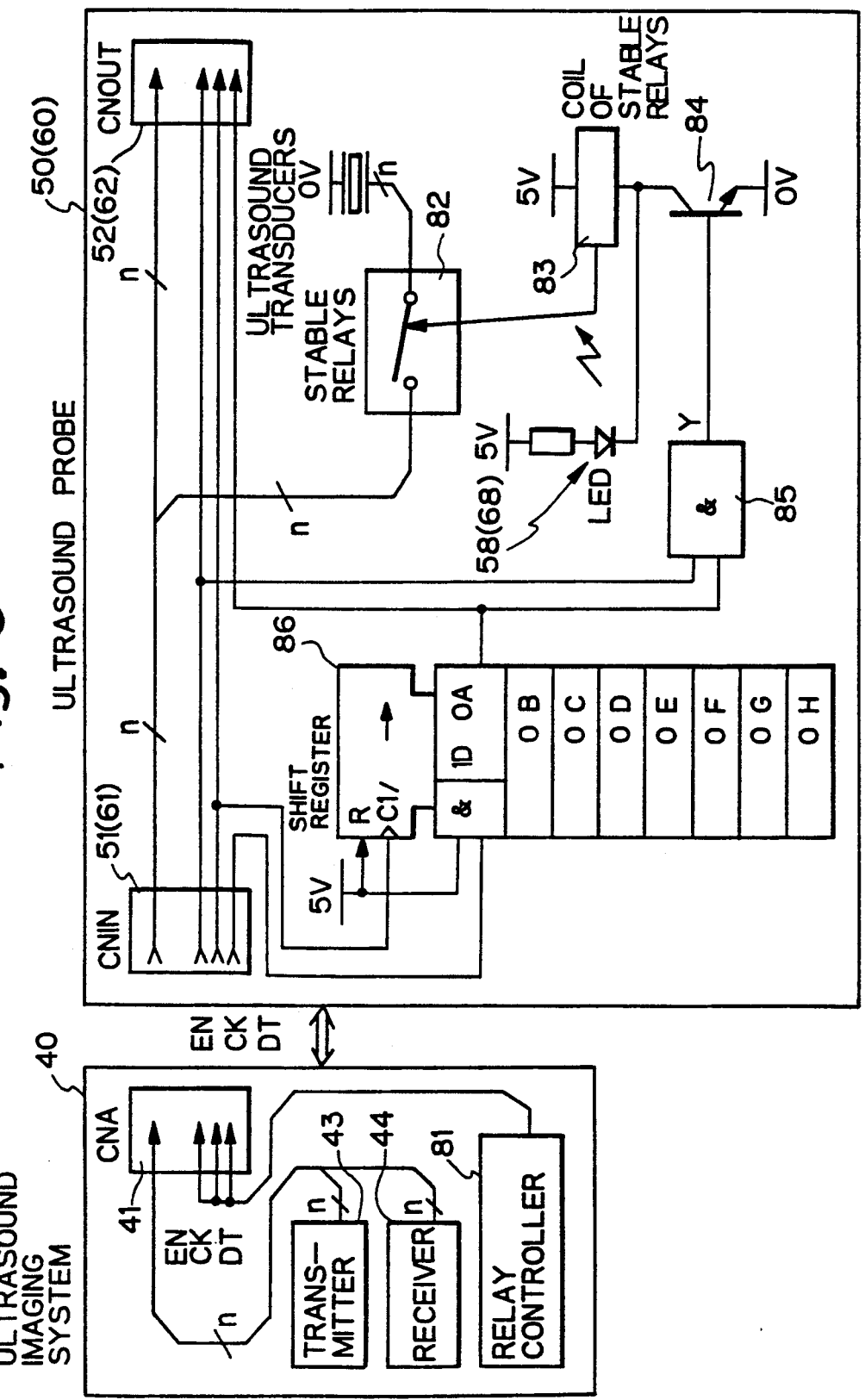
FIG. 5 is a block diagram of a first variant of the probe connection system in the embodiment.

First, an example of the probe connection by means of an input/output connector will be described below. This example uses electromagnetic relays as shown in FIG. 5.

The ultrasound imaging system 40 has a relay controller 81, instead of the previously-mentioned controller 42a. The ultrasound probe 50 or 60 has provided in the input/output connector 53 (or 63) thereof, which selects an electrically connected-status, a switch 82 and a coil 83 of normally off electromagnetic relays (stable relays), instead of the previously-described switch 53b (or 63b), and a circuit formed by a transistor 84, instead of the previously-mentioned switch controller 53a (or 63a), which excites the coil 83 of the electromagnetic relays, an AND circuit that turns on the transistor 84 and a shift register 86 that supplies a signal to the AND circuit 85.

Figure 6:
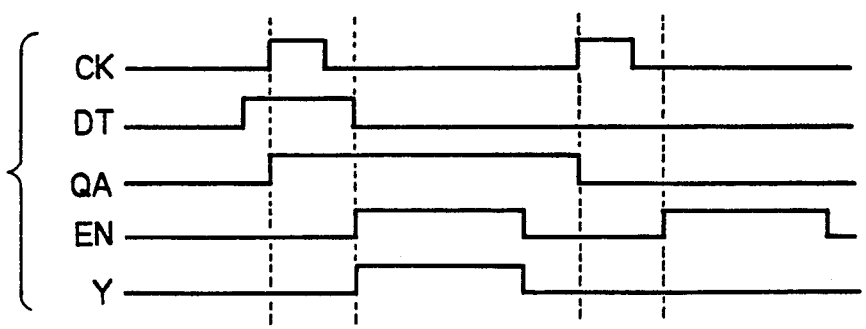
FIG. 6 is a time chart of the embodiment in FIG. 5.

As shown in FIG. 6, a data signal DT including a probe designation number and clock signal CK are supplied to the probe 50 or 60 from the relay controller 81 of the ultrasound imaging system 40. When a high level signal is delivered at the output terminal QA of the shift register 86 (provided in the corresponding probe) turned on with the signals DT and CK and an enable signal EN is supplied to the probe, both the high level signals QA and EN are ANDed by the AND circuit 85 to provide the result as a high level signal Y that will turn on the transistor 84 and excite the coil 83 of the electromagnetic relays so that the switch 82 is closed. The ultrasound transducers 55 (or 65) are excited to make an electroacoustic transducing for the generation of an ultrasound.

On the other hand, if no data signal DT is supplied even when the clock signal CK and enable signal EN are supplied, or if the data signal DT including another probe designation number is supplied, no high level signal is delivered at the output terminal QA of the shift register 86 and also no high level signal is delivered from the AND circuit 85. In this case, the switch 82 is opened with the transistor 84 not turned on and also with the coil 83 of the electromagnetic relays not excited, so that the ultrasound transducers 55 (or 65) will not be excited. Thus no ultrasound is generated.

Figure 8:
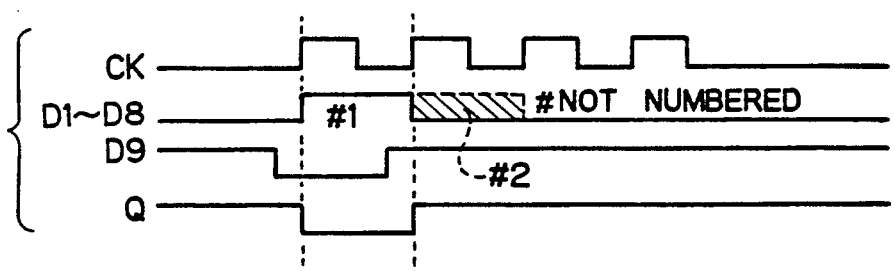
FIG. 8 is a time chart of the embodiment in FIG. 7.

A variant of the probe information transmission system will be explained with reference to FIG. 8. In this example, a combination of a three-state buffer and pin board is adopted.

The ultrasound imaging system 40 is supplied with a clock signal CK and control bit signal D9 from an 8-bit data line (for transmission of data signals D1 to D8) grounded by means of a resistor 91 and the probe information interface 46, and delivers the data signals D1 to D8 to the data line.

The probe 50 (or 60) is provided with a flip-flop 91, instead of the previously-mentioned input/output connector 53. The flip-flop 92 is supplied with a clock signal CK and control bit signal D9. The flip-flop 92 is so arranged that when an initial clock signal CK is supplied, its output signal Q takes a low level and when a second clock signal CK is supplied, the output signal takes a high level. Also a three-state buffer 93 is provided that is supplied at the two enable terminals EN with the output signal Q of the flip-flop 92 to input and output a hold data. Further, there are provided a pin board 94, instead of the previously-described probe coder 57 (or 67), to set probe information that is to be stored in the three-state buffer 93, and as many resistors 95 as the pins interposed between one end of the pin board 94 and the power source. The pin board 94 sets the necessary 8-bit information taking as "1" the position where a short-circuit bar 94a is inserted and as "0" the position where no such short-circuit bar is inserted. Such 8-bit information, namely, information on the ultrasound probe in consideration, is read out once to the buffer 93 and the result is transmitted to the ultrasound imaging system 40.

In the above-mentioned arrangement, when the control bit signal D9 takes a low level while the clock signal CK takes a high level, the flip-flop 92 delivers an output signal Q at the same low level as the control signal D9 so that the three-state buffer 93 becomes active and probe information held after being supplied from the pin board 94 is delivered. When the control bit signal D9 takes a high level and clock signal CK also takes a high level, the flip-flop 92 delivers an output signal Q at the same high level as the control bit signal D9 and a signal no longer delivered from the three-state buffer 93 so that the low level will result from grounding via the resistor 91 of the ultrasound imaging system 40. At this time, if an output is delivered from any other probe 60 (or 50) concurrently connected to the ultrasound imaging system, at least one of the lines for the data signals D1 to D8 remains at a high level. When an output signal no longer comes from any probe 50 or 60, all the data lines take a low level.

Figure 9:
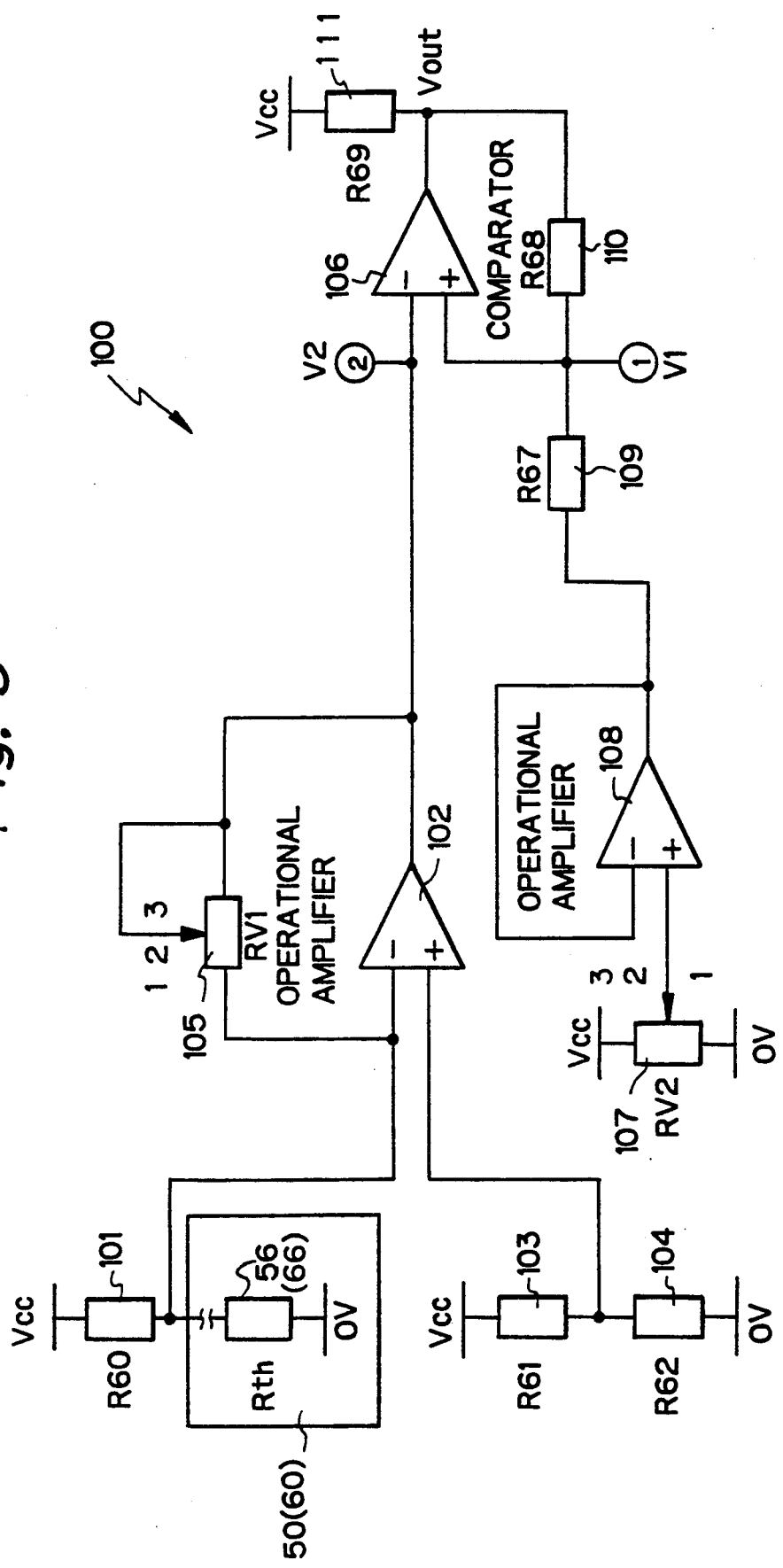
FIG. 9 is a block diagram of a thermal protection circuit as a first variant of the thermal monitoring system in the embodiment.

As shown in FIG. 9, the thermal monitoring system uses a thermistor that has a negative resistance-thermal characteristic. This thermal monitoring system has a thermal monitoring circuit that comprises a resistor and an operational amplifier in combination.

In a thermal protection circuit 100 formed, instead of the previously-described thermal monitoring circuit 45 of the ultrasound imaging system 40, there is provided a resistor (R60) 101 between a wire connected to the thermistor 56 (66) of the probe 50 (60) and the power source Vcc, and a wire between the thermistor 56 (66) and resistor 101 is branched and connected to the inversion input terminal (−) of an operational amplifier 102.

Two resistors 103 and 104 having different resistances are connected in series between the power source Vcc and ground potential (0V) and a wire between the resistor (R61) 103 and resistor (R62) 014 is branched and connected to the non-inversion input terminal (+) of the operational amplifier 102. The inversion input terminal (−) and output terminal of the operational amplifier 102 are wired to each other via a variable resistor (RV1) 105. The output terminal of the operational amplifier 102 is connected to the inversion input terminal (−) of a comparator 106.

There is connected between the power source Vcc and ground potential (0V), a variable resistor (RV2) 107 of which the variable terminal is connected to the non-inversion input terminal (+) of an operational amplifier 108. The inversion input terminal (−) of the operational amplifier 108 is connected to the output terminal thereof. The output terminal of the operational amplifier 108 is connected to the non-inversion input terminal (+) of the comparator 106 by means of a resistor (R67) 109. The non-inversion input terminal (+) of the comparator 106 is connected to the output terminal thereof by means of a resistor (R68) 110. There is connected a resistor (R69) 111 between the output terminal of the comparator 106 and power source Vcc.

Figure 10:
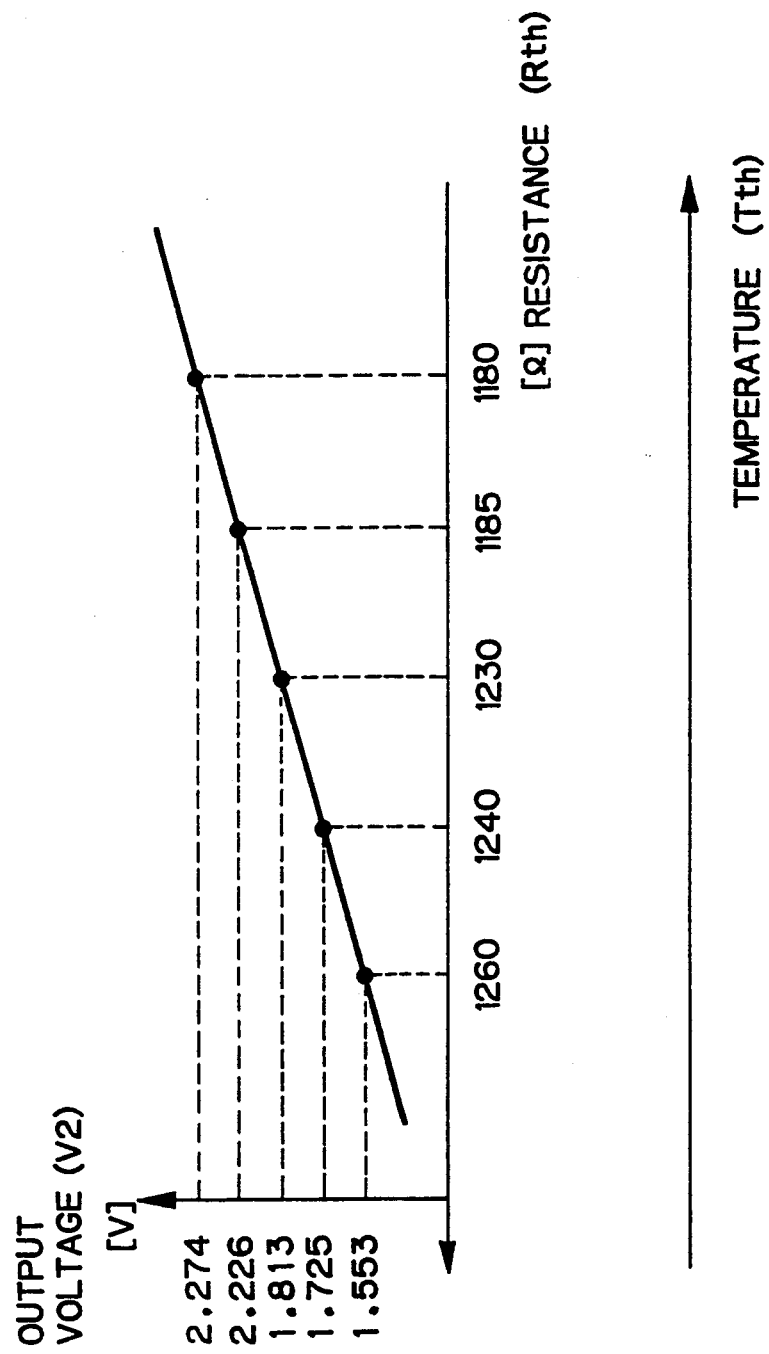
FIG. 10 is a graph showing the electricity-resistance characteristic of the thermistor in the embodiment.

As the temperature rises, the thermistor 56 (or 66) incorporated in the probe 50 (60) has a reduced resistance. As shown in FIG. 10, the characteristic of output voltage (V2) vs. resistance of thermistor 56 (or 66) is negative.

Figure 11:
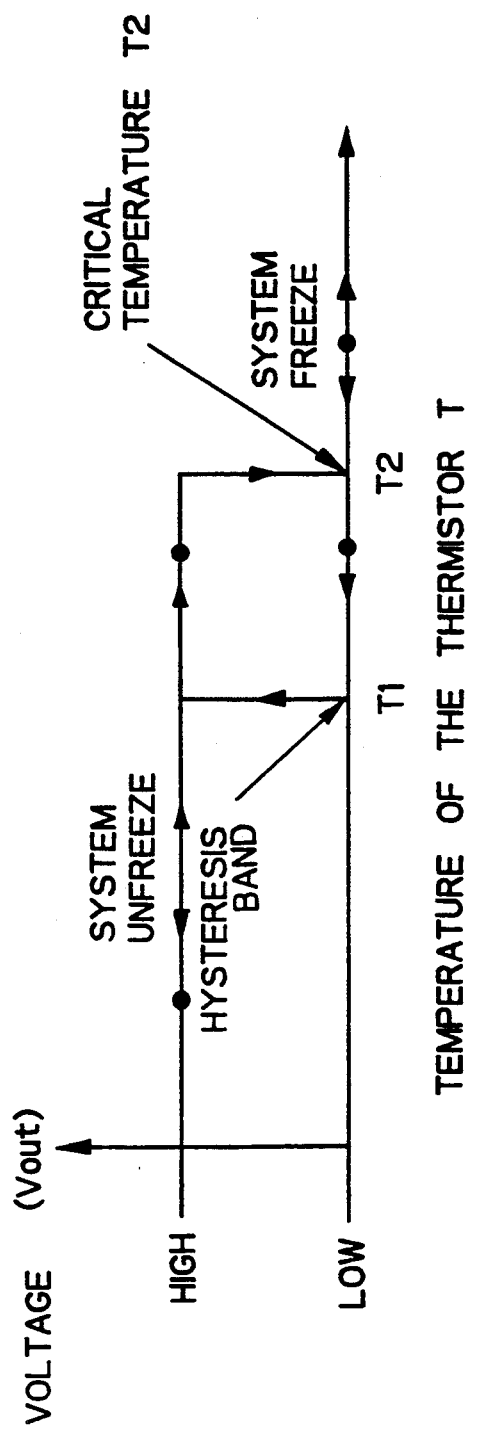
FIG. 11 is a graph showing the hysteresis characteristic of the thermal protection circuit in the embodiment.

In this thermal monitoring circuit, a hysteresis is set for the characteristic of the output voltage (Vout) vs. temperature measured by the thermistor 56 (or 66) shown in FIG. 11. If the temperature rises higher than predetermined, the output voltage (Vout) goes to a low level. When the temperature falls lower than predetermined, the output voltage (Vout) goes up to a high level, whereby chattering phenomena of the temperature control is prevented.

The thermal protection offered by this circuit is such that when the input signal V2 to the inversion input terminal (−) of the comparator 106 is larger than the input signal V1 to the non-inversion input terminal (+), the output signal from the output terminal goes lower so that the ultrasound transducers 55 (or 65) detect when the temperature has risen above the predetermined temperature and stops transmission of the electric signal that drives the probe. Thus, the probe is inhibited from generating more ultrasound.

Figure 12:
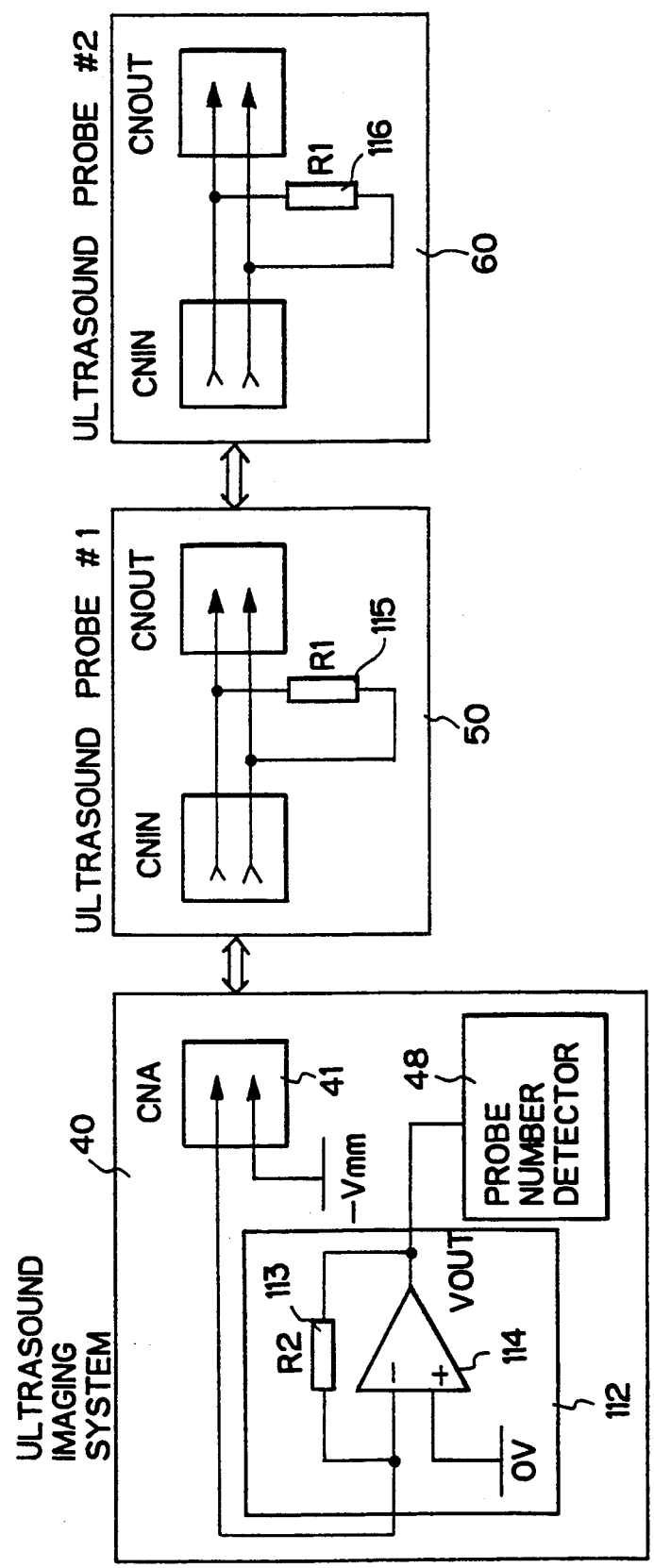
FIG. 12 is a block diagram of a first variant of the number-of-probes measuring system in the embodiment.
Figure 13:
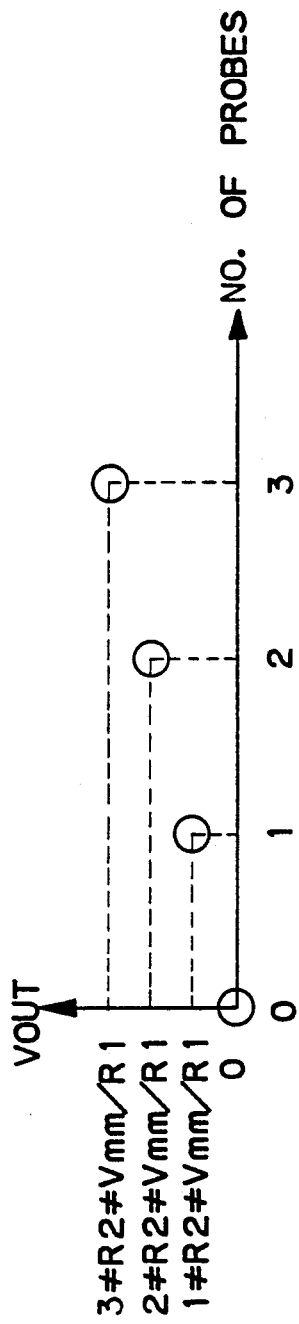
FIG. 13 is a graph showing the result of a number-of-connected-probes measurement in the embodiment in FIG. 7.

A system to detect the number of probes that has a measuring power source (−Vmm) provided in the ultrasound imaging system 40 as shown in FIG. 12 will be described.

There are provided between the plug connector 41 of the ultrasound imaging system 40 and the number-of-probes detector 48 an amplification circuit 112 on one of the transmission lines of the number-of-probes system. In the amplification circuit 112, there is provided an operational amplifier 114 of which the non-inversion input terminal (+) is grounded and the inversion input terminal (−) is connected to the output terminal thereof by means of a resistor (R2) 113. A negative power source (−Vmm) is connected to the other transmission lines of the number-of-probes detecting system connected to the plug connector 41.

In the probe 50 (or 60) a resistor (R1) 115 (or 116) is connected between the number-of-probes detecting buses. The resistor 115 is an example of the probe check signal generator used in the number-of-probes detecting system connected to the ultrasound imaging system 40 according to the present invention. In this embodiment, resistors having the same resistance are provided in the respective ultrasound probes. More particularly, one ultrasound probe develops a voltage for one resistor, so that by checking the overall voltage drop, it is possible to know how many probes are connected to the ultrasound imaging system 40.

Since the output voltage of the operational amplifier 114 is proportional to the number of probes connected to the ultrasound imaging system 40, the number of probes connected can be easily known by measuring the output voltage of the comparison circuit 112 in the number-of-probes detector 112. This is a very simple way to know the number of connected probes and can be done even with the cap 70 not attached.

Variants of these embodiments will be described with reference to FIGS. 14 to 21.

Figure 14:
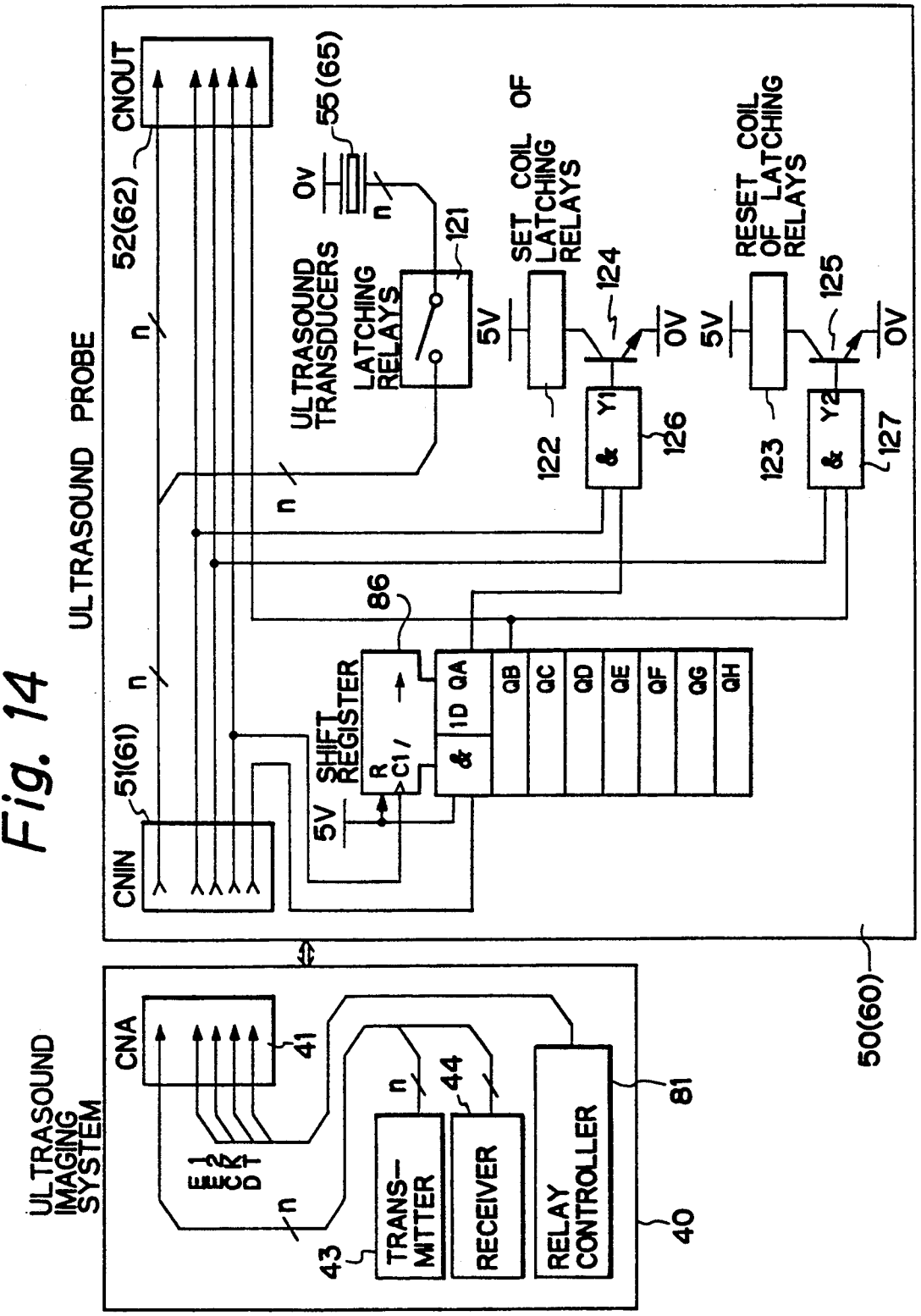
FIG. 14 is a block diagram of a second variant of the probe connection system in the embodiment.

A variant of the probe connection by means of an input/output connector will be described below. This variant uses latching relays as shown in FIG. 14.

In the Figure, the reference numeral 121 indicates a switch for the latching relays, 122 a set coil of the latching relays, and 123 a reset coil of the latching relays. The set coil 122 and reset coil 123 of the latching relays are excited by transistors 124 and 125, respectively, which are turned on with output signals (transistor ON signal) from AND circuits 126 and 127, respectively. When the output signal from the output terminal QA of the shift register 86 and control signal E1 from the relay controller 81 are at a high level, the AND circuit 126 delivers a high level signal (transistor ON signal), and when the output signal from the output terminal QB of the shift register 86 and control signal E2 from the relay controller 81 are at a low level, the AND circuit 127 delivers a high level signal (transistor ON signal). Other arrangements of the probe connecting system are similar to those in the first variant.

Figure 15:
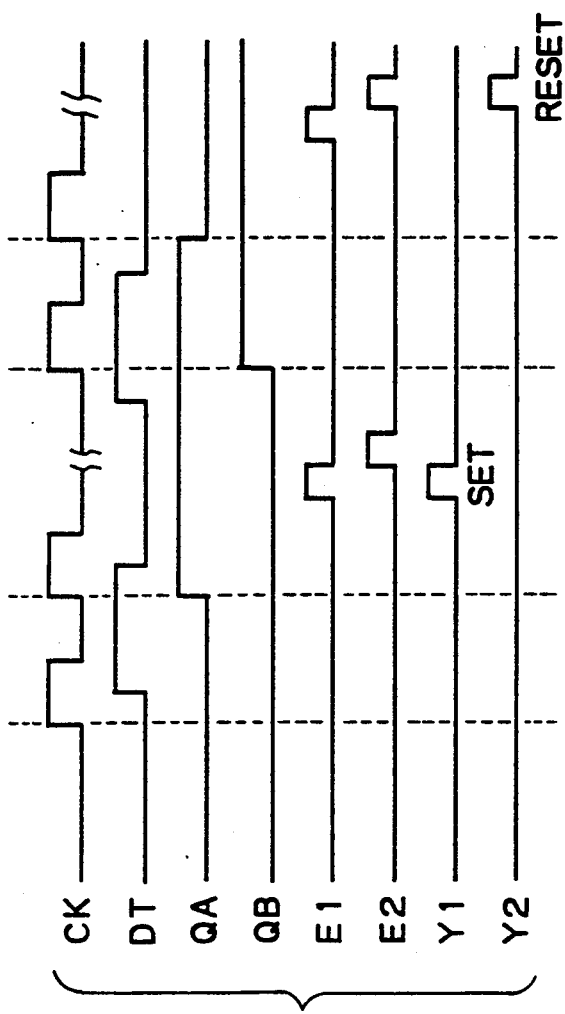
FIG. 15 is a time chart of the embodiment in FIG. 14.

As shown in FIG. 15, when the relay controller 81 delivers a clock signal CK and a data signal DT including a probe designation number, the output signal delivered at the output terminal QA of the shift register 86 takes a high level at the second rise of the clock signal CK. When a control signal (enable signal) E1 is delivered from the relay controller 81, the AND circuit 126 supplies a transistor on signal (Y1), the set coil 122 is excited and thus the switch 121 is closed. The ultrasound transducers 55 (or 65) produces an ultrasound.

Thereafter, a high level signal is delivered at the output terminal QB of the shift register 86 synchronously with the rise of clock signal, and a control signal (enable signal) E2 is delivered from the relay controller 81. Then the AND circuit 127 generates a transistor ON signal (Y2), the reset coil 123 is excited and the switch 121 is opened. Thus the ultrasound transducers 55 (or 65) are stopped from generating ultrasound. Since it is necessary to supply a current only for operating the latching relays, the power consumption by the coil is very small.

Figure 16:
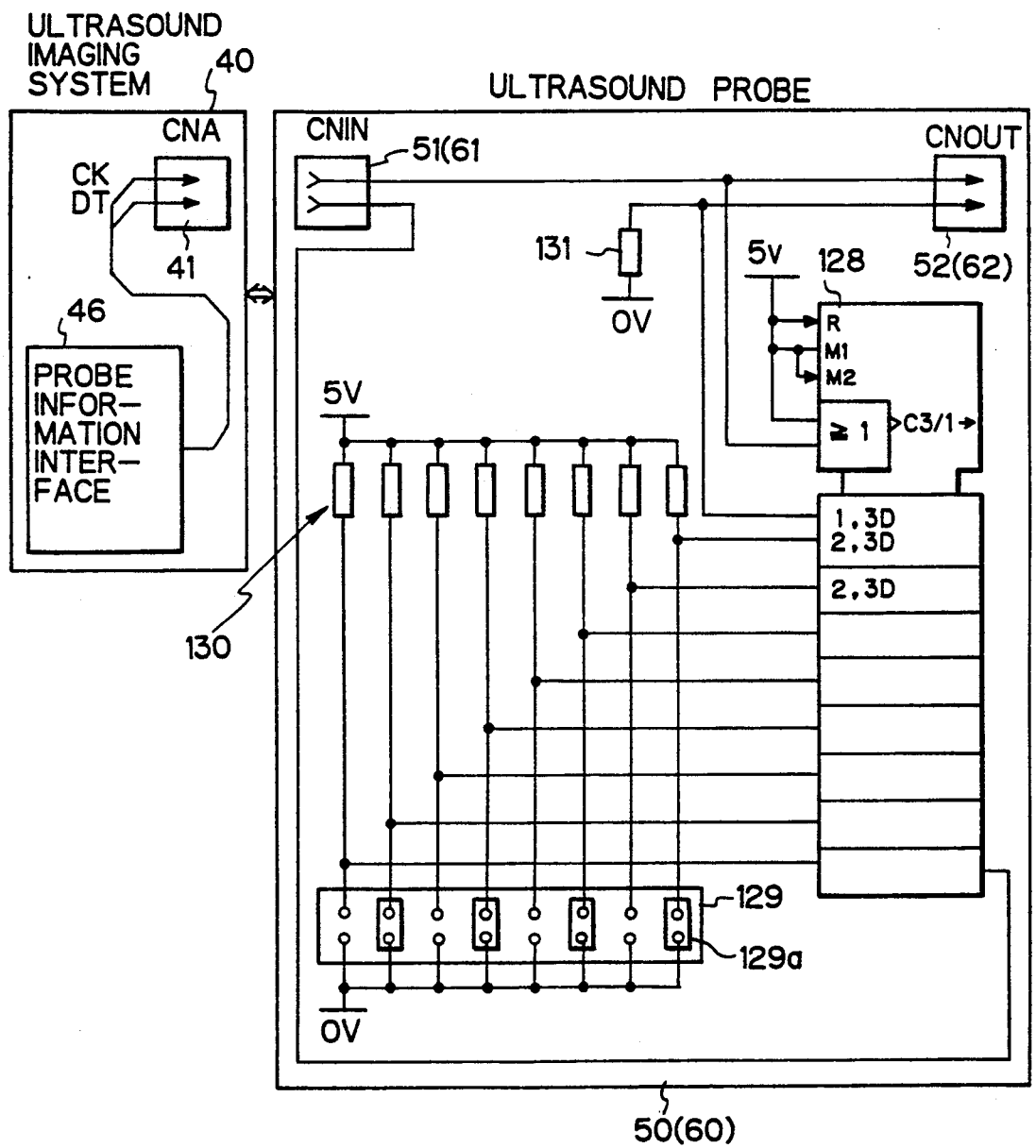
FIG. 16 is a block diagram of a second variant of the probe information transmission system in the embodiment.

As shown in FIG. 16, the probe information transmission system comprises a shift register 128 that can store each bit of an 8-bit data and shifts the stored data individually toward the output terminal QH by delivering one bit at the output terminal QH each time a clock signal CK is supplied, a pin board 129 so connected as to supply one bit into each storage area of the shift register 128, and a power source (5 V) connected to each bit setting terminal of the pin board 129 by means of a resistor 130.

The output terminal QH of the shift register 128 is connected to the transmission terminal for data signal DT of the receptacle connector 51 (or 61), the transmission terminal for data signal DT of the plug connector 52 (or 62) is connected to the first storage area (input terminals 1D and 3D) of the shift register 128, and the transmission line (interconnecting wire) is branched at the mid point and grounded by means of a resistor 131. The resistance of the resistor 131 is sufficiently high for transmission of a digital signal on the transmission line between the plug connector 52 (or 62) and shift register 128. Concerning the probe information in the probe information transmission system, insertion of at least one short-circuit bar 129a into the pin board 129 of the probe 50 (or 60) represents 8-bit data other than zero, and all 8 bits being zeros means that no probe is connected.

Figure 17:
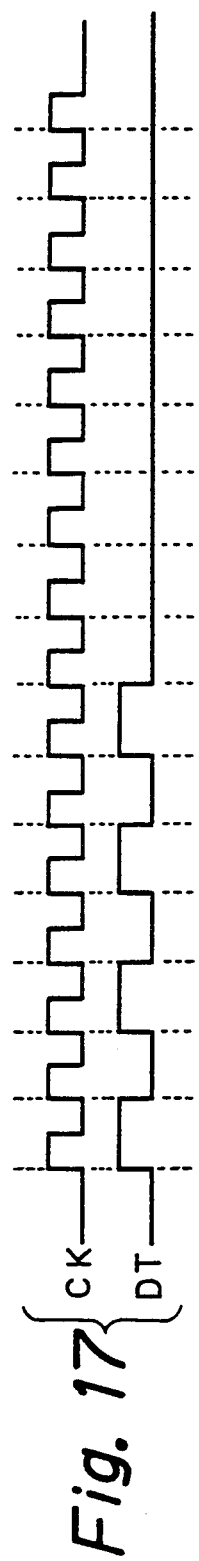
FIG. 17 is a time chart of the embodiment in FIG. 16.

As shown in FIG. 17, each time a clock signal CK is supplied to the shift register 128, one bit is delivered as data signal DT at the output terminal QH. If only one probe 50 (or 60) is connected to the ultrasound imaging system 40, the top 8 clock signals CK allows the transmission of probe information other than zero and the subsequent 8 clock signals CK are to transmit probe information for all 8 bits being zeros, which imparts that no more probes are connected.

In the case that the probes 50 and 60 are connected to each other, the output from the shift register at the probe 60 is connected to the first storage area of the shift register 128 at the probe 50 by means of the plug connector 52. With the top 8 clock signals CK, the probe information on the probe 50 is supplied to the probe information interface 46 and with the subsequent 8 clock signals CK, the probe information on the probe 60 is supplied to the probe information interface 46 through the shift register 128 at the probe 50.

Therefore, by reading out the probe information once to the probe information interface 46 after connection of a probe, all the probe information on the probes 50 and 60 currently connected can be supplied to the ultrasound imaging system 40 and do not have to be read out at the subsequent use of the probes.

Figure 18:
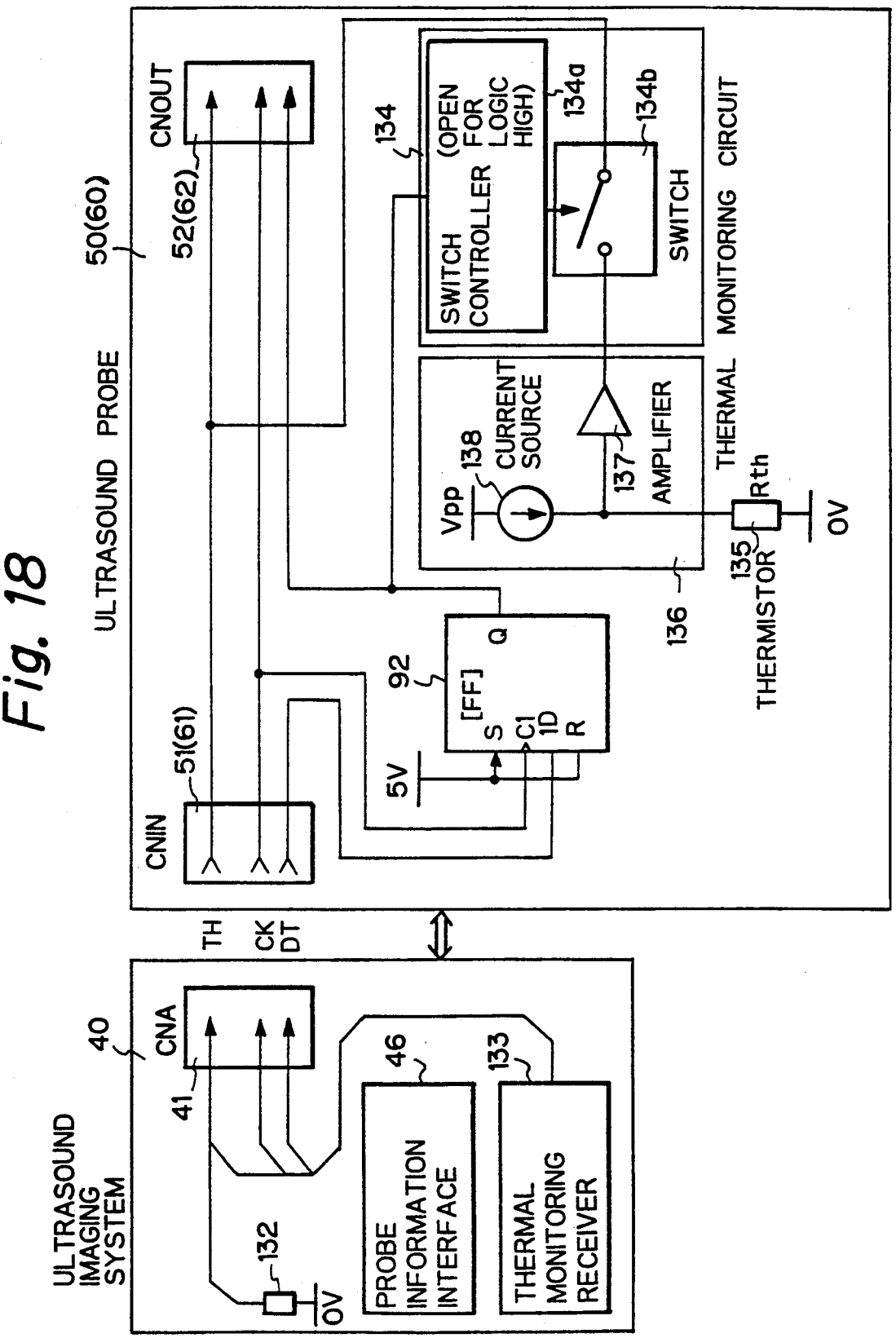
FIG. 18 is a block diagram of a second variant of the thermal monitoring system in the embodiment.

In a variant shown in FIG. 18, the thermal monitoring system uses a thermistor that has a negative resistance-thermal characteristic. This thermal monitoring system has a thermal monitoring circuit provided in the probe.

In this variant, the ultrasound imaging system 40 has a thermal data line (for transmission of thermal data TH) grounded by means of a resistor 132 and delivers clock signal CK and control bit signal DT at the probe information interface 46. Also it has a thermal monitoring receiver 133, instead of the previously-mentioned thermal monitor, which receives thermal data detected at the probe 50 (or 60).

The probe 50 (or 60) comprises a flip-flop 92, instead of the previously-mentioned input/output connector 53 (or 63), which when supplied with clock signal CK and control bit signal DT, delivers a low level output signal Q with the first clock signal CK and a high level output signal Q with the second clock signal CK, a switch controller 134a that opens a switch 134b when the output signal Q from the flip-flop 92 takes a high level, the switch 134b that opens and closes under the control of the switch controller 134a, a thermistor 135, instead of the previously-described thermosensor 56 (or 66), which has a negative resistance-temperature characteristic, an amplifier 137, in place of the thermal monitoring circuit 136, which amplifies the output signal from the thermistor 135, and a DC source 138 that supplies a current to the amplifier 137 and thermistor 135.

Figure 19:
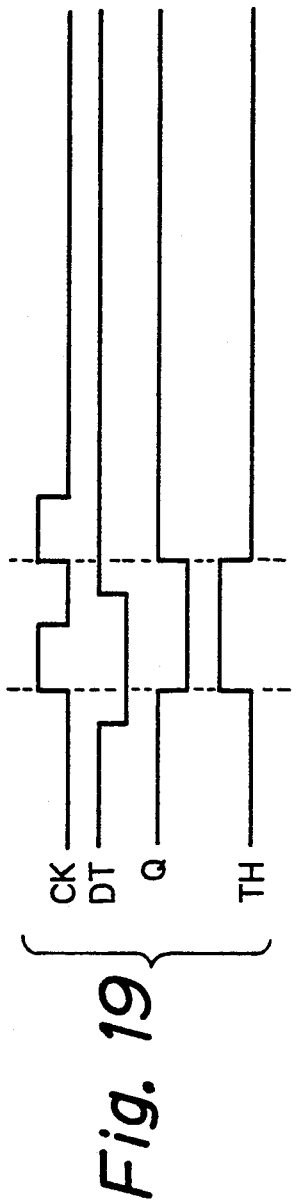
FIG. 19 is a time chart of the embodiment in FIG. 18.

As shown in FIG. 19, when the control bit signals DT delivered from the probe information interface 46 takes a low level while the clock signal CK takes a high level, the flip-flop 92 delivers an output signal Q at the same level as the control bit signal DT, the switch 134b is closed under control of the switch controller 134a to which the low level signal has been supplied, thereby transmitting to the thermal monitoring receiver 133 at the ultrasound imaging system 40 the thermal data TH measured by the thermistor 135 and amplified by the amplifier 137.

A variant of the number-of-probes detecting system will be described that has a current source (Ipp) provided at the ultrasound imaging system 40 as shown in FIG. 20.

There is provided, between the plug connector 41 of the ultrasound imaging system 40 and the number-ofprobes detector 48, a current source (Ipp) connected to a branch of one of the transmission lines of the number-of-probes detecting system, with the other transmission line connected to the plug connector 41 being grounded. At the probe 50 (or 60), there is provided between the receptacle connector 51 (or 61) and plug connector 52 (or 62) a resistor (R1) 141 (or 142) for one of the buses of the number-of-probes detecting system. The resistors 141 and 142 are of the same resistance.

The circuitry of this number-of-probes detecting system is formed by connecting the receptacle connector 51 (or 61) of the probe 50 (or 60) to the plug connector 41 of the ultrasound imaging system 40 and the receptacle connector 70a of the cap 70 to the plug connector 52 (or 62) of the probe, or alternately by further connecting the receptacle connector 61 (or 51) of the other probe 60 (or 50) to the plug connector 52 (or 62) of the probe and the receptacle connector 70a of the cap 70 to the plug connector 62 (or 52) of the probe.

Figure 21:
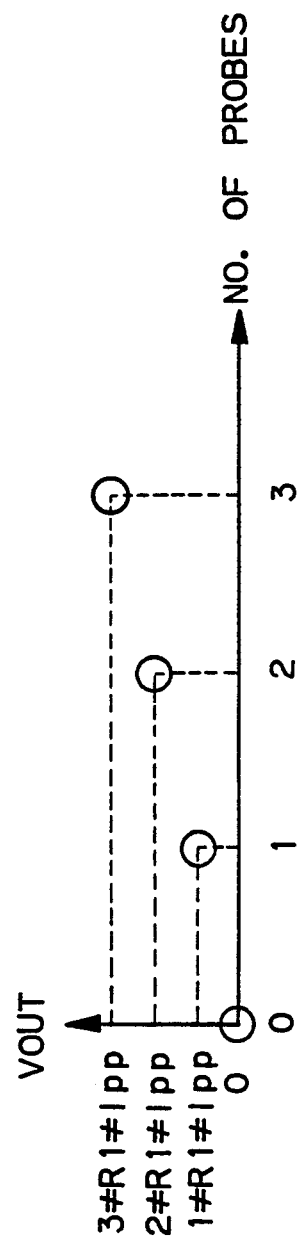
FIG. 21 is a time chart of the embodiment in FIG. 20.
Figure 22:
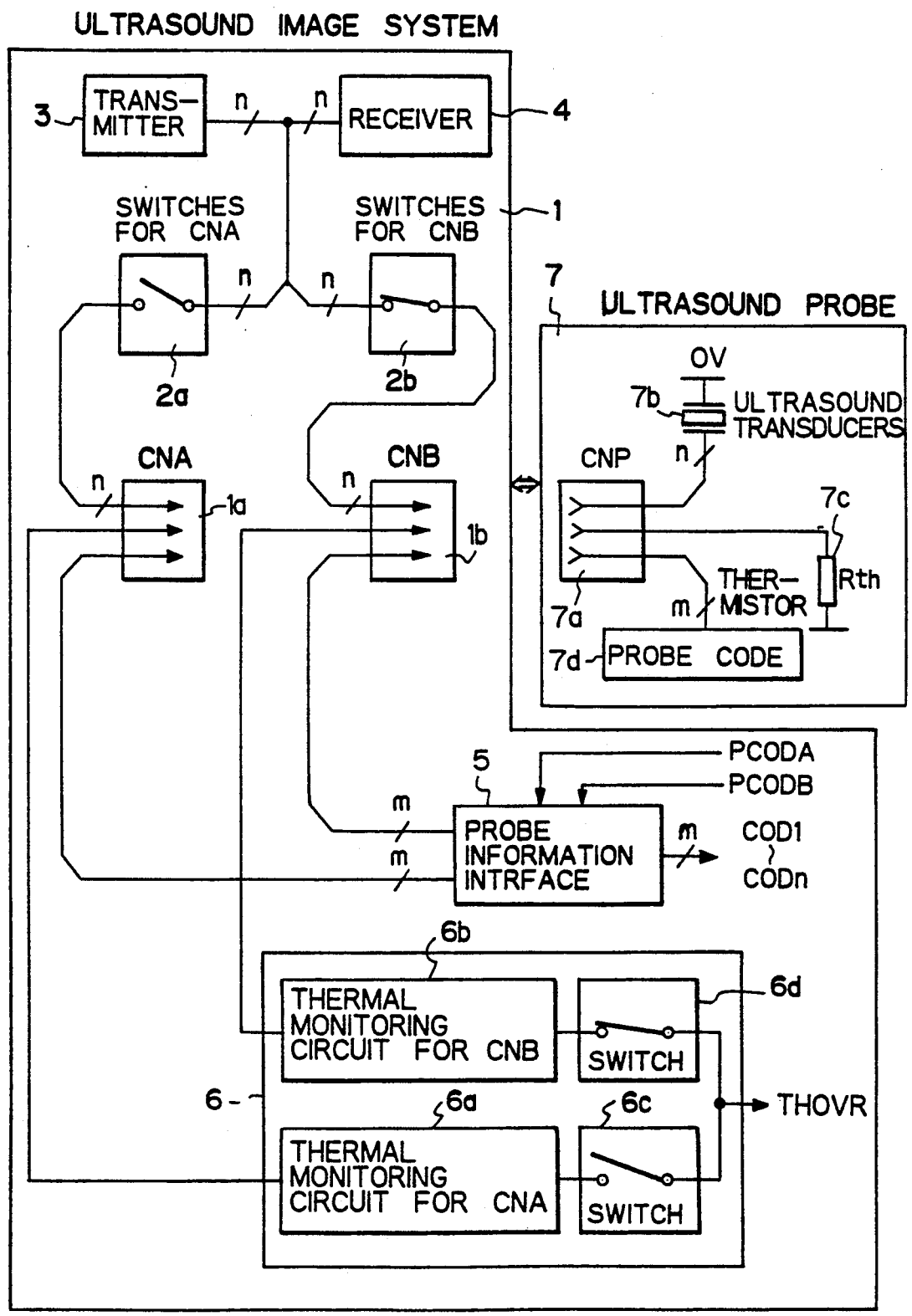
FIG. 22 is a block diagram of a prior-art diagnostic sonography system.

As shown in FIG. 21, the voltage rises in proportion to the constant current (Ipp) from the power source (Vpp) and as the product of the current (Ipp) and the number of probes 50 (or 60) to which the resistors 141 and 142 are connected, which assures easy confirmation of the number of probes connected. In this case, the circuit of the number-of-probes detecting system is not formed, no current is carried and the resistance becomes infinitely higher unless the cap 70 is attached. Thus the presence or absence of the cap 70 is easily known.

The embodiment of the present invention can be varied and modified in various manners for a highly efficient ultrasound study, for a variable number of probes connected and for a simplified construction and preliminary operation of the equipment.

As having been described in the foregoing, the connecting device 13a (or 13b) of the ultrasound probe 11a (or 11b) is connected as fitted to the single connecting device 10a of the ultrasound imaging system 10 and the connecting device 13b (or 13a) of the other ultrasound probe 11b (or 11a) is connected as fitted to the other connecting device 14a (or 14b) of the ultrasound probe 11a (or 11b). A plurality of ultrasound probes 11a and 11b can be connected to the single connecting device 10a of the ultrasound imaging system 40. Namely, a necessary number of ultrasound probes can be connected to the ultrasound imaging system 40 before starting an ultrasound study. Thus, since it is unnecessary to replace the probe in the middle of the ultrasound study, the diagnosis can be done very easily and efficiently.

Also, by opening and closing the input/output connector 21 provided at the ultrasound probe 11a (or 11b) the transducer 16a (or 16a) of an ultrasound probe 11a (or 11b) to be used is connected to the ultrasound imaging system 10. So one of the plurality of ultrasound probes 11a or 11b connected to the single connecting device 10a of the ultrasound imaging system 40 can be used as selected. No probe selecting device has to be provided at the ultrasound imaging system 10. Thus, the equipment construction can be considerably simplified, equipment operability during an ultrasound study can be greatly improved and the time for ultrasound diagnosis can be effectively shortened.

Furthermore, the probe information set at the transducer 16a (16b) in an ultrasound probe 11a or 11b of which the connection is indicated can be used for correct electroacoustic transducing of diagnostic ultrasound when the probe temperature is measured within a predetermined range. Therefore, even when a plurality of ultrasound probes 11a and 11b are connected to the same connecting device 10a of the ultrasound imaging system 10, a desired probe cannot be mistaken for any other probe, thus ensuring a correct and rapid ultrasound diagnosis.

In the diagnostic sonography system according to the present invention, a notice from each number-of-probes informing means 26 is received by the number-of-probes detector 36 of the ultrasound imaging system 10 to confirm the number of ultrasound probes 11a or 11b connected to the same connecting device 10a of the ultrasound imaging system 10, thereby permitting the operator to easily know a plurality of ultrasound probes connected.

Also in the diagnostic sonography system, the blind cap 12 can be attached to the connecting device 10a of the ultrasound imaging system 10 or the connecting device 14a or 14b of the ultrasound probe 11a or 11b. Thus supply of an unnecessary signal or power from the connecting device 10a, 14a or 14b open-circuited can be avoided thereby eliminating a cause of damage to the equipment or mistaking of an ultrasound probe during ultrasound diagnosis.

I claim:

1. A diagnostic sonography system comprising:
    a plurality of ultrasound probes;
    an ultrasound imaging having a connecting device for connection of at least one of the ultrasound probes and including either a plug or a receptacle connector, and a monitor supplied with ultrasound data from a selected one of the ultrasound probes through the connecting device, to analyze/display the ultrasound data,
    each of said ultrasound probes including
    a first connecting device connectable to either said connecting device of said ultrasound imaging system or a connecting device of an other ultrasound probe,
    an interconnecting wire,
    a second connecting device connectable to said connecting device of said first connecting device with the interconnecting wire and to said connecting device of one of said other ultrasound probes, and
    a transducer branched from the interconnecting wire between said first and second connecting devices.

2. A diagnostic sonography system as set forth in claim 1, wherein said first interconnecting device includes a plug or receptacle connector and said second conencting device includes a receptacle or plug connector.

3. A diagnostic sonography system as set forth in claim 1, further comprising input/output connecting means for setting a status of a connection between said ultrsound probes and said ultrasound imaging system.

4. A diagnostic sonography system as set forth in claim 3, wherein said input/output connecting means is adapted to deliver, in response to a predetermined control signal from said ultrasound imaging system, data on said transducer in said ultrasound probe to said ultrasound imaging system.

5. A diagnostic sonography system as set forth in claim 1, wherein said diagnostic sonography system is for use with an examinee body, said transducer including at least one of
    electroacoustic transducing means for converting an electric signal to an ultrasound signal that is transmitted into an examinee body, and for converting, to an electric signal, the ultrasound signal that is transmitted into an reflected from inside the examinee body, probe information setting means for setting information and for supplying said ultrasound imaging system with set probe information, and connected-status displaying means for sight, sound or touch checking of the connected status.

6. A diagnostic sonography system as set forth in claim 4, wherein said probe information setting means is adapted to deliver coded information associated with each ultrasound probe to said ultrasound imaging system based on a predetermined control signal.

7. A diagnostic sonography system as set forth in claim 1, further comprising thermosensing means for detecting a temperature of one of the ultrasound probes currently connected.

8. A diagnostic sonography system as set forth in claim 1, further comprising probe check signal generating means for generating predetermined information on one of the ultrasound probes.

9. A diagnostic sonography system as set forth in claim 8, wherein said probe check signal generating means includes at least one of a resistor, a constant current source, and a constant voltage source.

10. A diagnostic sonography system as set forth in claim 8, wherein said probe check signal generating means includes at least one of a resistor, a constant current source, and a constant voltage source.

11. A diagnostic sonography system for use with an examinee, comprising:

an ultrasound imaging system having a connecting device for connection of at least one of the ultrasound probes and including either a plug or receptacle connector, and a monitor supplied with ultrasound data from a selected one of the ultrasound probes through the connecting device, to analyze/-display the ultrasound data, said monitor further including means for transmitting to said monitor an electric signal that will generate an ultrasound signal, a probe information interface for selectively reading information from at least two of said ultrasound probes connected to the ultrasound imaging system, and display driving means for generating a signal to drive a connected-status display provided in said ultrasound probe.

12. A diagnostic sonography system as set forth in claim 11, wherein said monitor further comprises input/output connection driving means for driving an input-/output connector provided in said ultrasound probe connected to said ultrasound imaging system.

13. A diagnostic sonography system as set forth in claim 11, said monitor further including thermal monitoring means for detecting, upon receiving a signal from a theremosensor provided in at least one of said ultrasound probes, a temperature of the at least one of the ultrasound probes.

14. A diagnostic sonography system as set forth in claim 11, wherein said monitor further includes means for detecting a number of said ultrasound probes connected to said ultrasound imaging system or a change in the number.

15. A diagnostic sonography system comprising;

a plurality of ultrasound probes;

an ultrasound imaging system having a connecting device for connection of at least one of the ultrasound probes and including either a plug or receptacle connector, and a monitor supplied with ultrasound data from one of the ultrasound probes through said connecting device, being selected for scanning by a switch controller included in said ultrasound imaging system.

16. A diagnostic sonography system as set forth in claim 15, wherein said ultrasound imaging system is provided with displaying means for displaying information on all of the ultrasound probes connected to said ultrasound imaging system.

17. A diagnostic sonography system as set forth in claim 15, wherein said ultrasound imaging system includes selection controlling means for selecting one of the ultrasound probes displayed on said displaying means.

18. A diagnostic sonography system as set forth in claim 15, wherein the information on all of said ultrasound probes includes at least one of a type, application, and number of said ultrasound probes.

19. A diagnostic sonography system as set forth in claim 15, wherein a blind cap is provided at a terminal of one, which forms a free end, of the connecting devices of one of the plurality of ultrasound probes connected to each other.

20. A system comprising:

a first ultrasound probe;

a second ultrasound probe serially connected to the first ultrasound probe; and an ultrasound imaging system connected to the first ultrasound probe, and capable of selectively activating one of said first and second ultrasound probes.

* * * * *

UNITED STATES PATENT AND TRADEMARK OFFICE
CERTIFICATE OF CORRECTION

PATENT NO. : 5,318,027
DATED : June 7, 1994
INVENTOR(S) : FUKUI

It is certified that error appears in the above-indentified patent and that said Letters Patent is hereby corrected as shown below:

FRONT PAGE: [56] References Cited, underneath of the section labelled "U.S. PATENT DOCUMENTS" insert the following:

FOREIGN PATENT DOCUMENTS 36 24 668    02/05/87    Germany

OTHER REFERENCES

W. BUSCHMANN, "New Equipment and Transducers for Ophthalmic Diagnosis," ULTRASONICS, March 1965, Berlin, Germany, pages 18-21.

C.R. HILL, "Ultrasonic imaging", JOURNAL OF PHYSICS E; SCIENTIFIC INSTRUMENTS, No. 3, March 1976, Bristol, GB, pages 153-162.

Col. 17, line 9, change "4" to --5--.

Signed and Sealed this

Fifteenth Day of November, 1994

Attest:

BRUCE LEHMAN

Attesting Officer    Commissioner of Patents and Trademarks